US012718977B2

(12) United States Patent
Nakamura

(10) Patent No.: US 12,718,977 B2
(45) Date of Patent: Aug. 25, 2026

(54) WOUND CORE

(71) Applicant: NIPPON STEEL CORPORATION, Tokyo (JP)

(72) Inventor: Shuichi Nakamura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 774 days.

(21) Appl. No.: 18/033,398

(22) PCT Filed: Oct. 26, 2021

(86) PCT No.: PCT/JP2021/039555
§ 371 (c)(1),
(2) Date: Apr. 24, 2023

(87) PCT Pub. No.: WO2022/092118
PCT Pub. Date: May 5, 2022

(65) Prior Publication Data

US 2023/0386727 A1 Nov. 30, 2023

(30) Foreign Application Priority Data

Oct. 26, 2020 (JP) ................................ 2020-178553

(51) Int. Cl.
*H01F 27/245* (2006.01)
*H01F 1/16* (2006.01)

(52) U.S. Cl.
CPC ........... *H01F 27/2455* (2013.01); *H01F 1/16* (2013.01)

(58) Field of Classification Search
CPC .. H01F 27/2455; H01F 1/147; H01F 1/14775; H01F 1/16; H01F 3/02; H01F 27/25; C22C 38/02; C21D 6/008
(Continued)

(56) References Cited

U.S. PATENT DOCUMENTS

2013/0213525 A1 8/2013 Shingaki et al.
2016/0336100 A1* 11/2016 Shiota ................ H01F 27/2455
(Continued)

FOREIGN PATENT DOCUMENTS

AU 2012337260 A1 5/2014
EP 3 101 667 B1 12/2019
(Continued)

*Primary Examiner* — Tszfung J Chan
(74) *Attorney, Agent, or Firm* — Birch, Stewart, Kolasch & Birch, LLP

(57) ABSTRACT

This wound core is a wound core including a substantially rectangular wound core main body in a side view, wherein, in the wound core main body, first planar portions and corner portions are alternately continuous in a longitudinal direction, each corner portion has a curved shape in a side view of the grain-oriented electrical steel sheet, two or more bent portions having a second planar portion between the adjacent bent portions are provided, and in at least one of the first planar portion and second planar portion in the vicinity of the bent portion, the following Formula (1) is satisfied:

$$(Nac+Nal)/Nt \geq 0.010 \quad (1)$$

here, Nt is a total number of grain boundary determination locations in the first planar portion and second planar portion region adjacent to the bent portion, and Nac and Nal each are a number of determination location at which subgrain boundaries are able to be identified in a direction parallel to and direction perpendicular to the bent portion boundary.

13 Claims, 7 Drawing Sheets

(58) Field of Classification Search
USPC .......................................... 336/200, 232, 234
See application file for complete search history.

(56) References Cited

U.S. PATENT DOCUMENTS

| | | | | |
|---|---|---|---|---|
| 2018/0171425 | A1* | 6/2018 | Shingaki .................. | C21D 9/46 |
| 2020/0087746 | A1* | 3/2020 | Omura ..................... | C21D 9/46 |
| 2021/0355557 | A1 | 11/2021 | Nakamura et al. | |

FOREIGN PATENT DOCUMENTS

| | | | | | |
|---|---|---|---|---|---|
| JP | 2001-192785 | A | | 7/2001 | |
| JP | 2001-303214 | A | | 10/2001 | |
| JP | 2004-143532 | A | | 5/2004 | |
| JP | 2005-240079 | A | | 9/2005 | |
| JP | 2005-286169 | A | | 10/2005 | |
| JP | 2006-219690 | A | | 8/2006 | |
| JP | 2012-52229 | A | | 3/2012 | |
| JP | 6224468 | B2 | | 11/2017 | |
| JP | 2018148036 | A | * | 9/2018 | ............... H01F 3/04 |
| JP | 2018157142 | A | * | 10/2018 | |
| WO | WO 2013/074268 | A1 | | 5/2013 | |
| WO | WO-2018131613 | A1 | * | 7/2018 | ........... H01F 41/024 |
| WO | WO 2020/027215 | A1 | | 2/2020 | |

* cited by examiner

WOUND CORE

TECHNICAL FIELD

The present invention relates to a wound core. Priority is claimed on Japanese Patent Application No. 2020-178553, filed Oct. 26, 2020, the content of which is incorporated herein by reference.

BACKGROUND ART

A grain-oriented electrical steel sheet is a steel sheet containing 7 mass % or less of Si and has a secondary recrystallization texture in which secondary recrystallization grains are concentrated in the {110}<001> orientation (Goss orientation). The magnetic properties of the grain-oriented electrical steel sheet greatly influence the degree of concentration in the {110}<001> orientation. In recent years, grain-oriented electrical steel sheets that have been put into practical use are controlled so that the angle between the crystal <001> direction and the rolling direction is within a range of about 5°.

Grain-oriented electrical steel sheets are laminated and used in iron cores of transformers, and require main magnetic properties such as a high magnetic flux density and a low iron loss. It is known that the crystal orientation has a strong correlation with these properties, and for example, Patent Documents 1 to 3 disclose precise orientation control techniques.

In a grain-oriented electrical steel sheet, the boundary at which the crystal orientation is recognized is a crystal grain boundary, and the behavior of movement of crystal grain boundaries for controlling the crystal orientation has been relatively deeply studied. However, there are not so many techniques for improving properties by controlling subgrain boundaries (small angle grain boundaries and small tilt angle grain boundaries) formed of a small number of dislocations present in the crystal grain with a specific arrangement, and such techniques are generally as disclosed in Patent Documents 4 to 7.

In addition, in the related art, for wound core production as described in, for example, Patent Document 8, a method of winding a steel sheet into a cylindrical shape, then pressing the cylindrical laminated body without change so that the corner portion has a constant curvature, forming it into a substantially rectangular shape, then performing annealing to remove strain, and maintaining the shape is widely known.

On the other hand, as another method of producing a wound core, techniques such as those found in Patent Documents 9 to 11 in which portions of steel sheets that become corner portions of a wound core are bent in advance so that a relatively small bent area having an inner radius of curvature of 5 mm or less is formed and the bent steel sheets are laminated to form a wound core are disclosed. According to this production method, a conventional large-scale pressing process is not required, the steel sheet is precisely bent to maintain the shape of the iron core, and processing strain is concentrated only in the bent portion (corner) so that it is possible to omit strain removal according to the above annealing process, and its industrial advantages are great and its application is progressing.

CITATION LIST

Patent Document

[Patent Document 1]
Japanese Unexamined Patent Application, First Publication No. 2001-192785
[Patent Document 2]
Japanese Unexamined Patent Application, First Publication No. 2005-240079
[Patent Document 3]
Japanese Unexamined Patent Application, First Publication No. 2012-052229
[Patent Document 4]
Japanese Unexamined Patent Application, First Publication No. 2004-143532
[Patent Document 5]
Japanese Unexamined Patent Application, First Publication No. 2006-219690
[Patent Document 6]
Japanese Unexamined Patent Application, First Publication No. 2001-303214
[Patent Document 7
WO 2020/027215
[Patent Document 8]
Japanese Unexamined Patent Application, First Publication No. 2005-286169
[Patent Document 9]
Japanese Patent No. 6224468
[Patent Document 10]
Japanese Unexamined Patent Application, First Publication No. 2018-148036
[Patent Document 11]
Australian Patent Application Publication No. 2012337260

SUMMARY OF THE INVENTION

Problems to be Solved by the Invention

The inventors studied details of efficiency of a transformer iron core produced by a method of bending steel sheets in advance so that a relatively small bent area having an inner radius of curvature of 5 mm or less is formed and laminating the bent steel sheets to form a wound core. As a result, they recognized that, even if steel sheets with substantially the same crystal orientation control and substantially the same magnetic flux density and iron loss measured with a single sheet are used as a material, there is a difference in iron core efficiency.

After investigating the cause, it was speculated that the difference in efficiency that is a problem is caused by the difference in the degree of iron loss deterioration during bending for each material.

In this regard, various steel sheet production conditions and iron core shapes were studied, and the influences on iron core efficiency were classified. As a result, the result in which steel sheets produced under specific production conditions are used as iron core materials having specific sizes and shapes, and thus the iron core efficiency can be controlled so that it becomes optimal efficiency according to magnetic properties of the steel sheet material, was obtained.

The present invention has been made in view of the above circumstances, and an object of the present invention is to provide a wound core produced by a method of bending steel sheets in advance so that a relatively small bent area having an inner radius of curvature of 5 mm or less is formed and laminating the bent steel sheets to form a wound core, and the wound core is improved so that unintentional deterioration of iron core efficiency is minimized.

Means for Solving the Problem

In order to achieve the above object, one embodiment of the present invention is a wound core including a substantially rectangular wound core main body in a side view, wherein the wound core main body includes a portion in which grain-oriented electrical steel sheets in which first planar portions and corner portions are alternately continuous in a longitudinal direction and the angle formed by two first planar portions adjacent to each other with each of the corner portions therebetween is 90° are stacked in a sheet thickness direction and has a substantially rectangular laminated structure in a side view wherein, in a side view of the grain-oriented electrical steel sheet, each of the corner portions has two or more bent portions having a curved shape and a second planar portion between the adjacent bent portions, and the sum of the bent angles of the bent portions present in one corner portion is 90°, the bent portion in a side view has an inner radius of curvature r of 1 mm or more and 5 mm or less, the grain-oriented electrical steel sheet has a chemical composition containing, in mass %, Si: 2.0 to 7.0%, with the remainder being Fe and impurities, and has a texture oriented in the Goss orientation, and in one or more of the first planar portion and the second planar portion adjacent to at least one of the bent portions, the existence frequency of subgrain boundaries in a region within 9 mm in a direction perpendicular to the boundary with the bent portion satisfies the following Formula (1):

$$(Nac+Nal)/Nt \geq 0.010 \quad (1)$$

Here, when a plurality of measurement points are arranged at intervals of 2 mm in the direction parallel to and direction vertical to the bent portion boundary in the region of the first planar portion or the second planar portion adjacent to the bent portion, Nt in Formula (1) is a total number of line segments connecting two adjacent measurement points in the parallel direction and the vertical direction.

Nac in Formula (1) is the number of line segments at which subgrain boundaries are able to be identified among the line segments in a direction parallel to the bent portion boundary, and Nal in Formula (1) is the number of line segments at which subgrain boundaries are able to be identified among line segments in a direction perpendicular to the bent portion boundary.

In addition, in the above configuration according to one embodiment of the present invention, in one or more of the first planar portion and the second planar portion adjacent to at least one of the bent portions, the following Formula (2) may be satisfied.

$$(Nac+Nal)/(Nbc+Nbl) > 0.30 \quad (2)$$

Here, Nbc in Formula (2) is the number of line segments at which grain boundaries other than the subgrain boundary are able to be identified among the line segments in a direction parallel to the bent portion boundary, and Nbl in Formula (2) is the number of line segments at which grain boundaries other than the subgrain boundary are able to be identified among the line segments in a direction perpendicular to the bent portion boundary.

In addition, in the above configuration according to one embodiment of the present invention, in one or more of the first planar portion and the second planar portion adjacent to at least one of the bent portions, the following Formula (3) may be satisfied.

$$Nal/Nac \geq 0.80 \quad (3)$$

In addition, in the above configuration according to one embodiment of the present invention, the chemical composition of the grain-oriented electrical steel sheet may contain, in mass %, Si: 2.0 to 7.0%,
Nb: 0 to 0.030%,
V: 0 to 0.030%,
Mo: 0 to 0.030%,
Ta: 0 to 0.030%,
W: 0 to 0.030%,
C: 0 to 0.0050%,
Mn: 0 to 1.0%,
S: 0 to 0.0150%,
Se: 0 to 0.0150%,
Al: 0 to 0.0650%,
N: 0 to 0.0050%,
Cu: 0 to 0.40%,
Bi: 0 to 0.010%,
B: 0 to 0.080%,
P: 0 to 0.50%,
Ti: 0 to 0.0150%,
Sn: 0 to 0.10%,
Sb: 0 to 0.10%,
Cr: 0 to 0.30%, and
Ni: 0 to 1.0% with the remainder being Fe and impurities.

In addition, in the above configuration according to one embodiment of the present invention, the chemical composition of the grain-oriented electrical steel sheet may contain a total amount of 0.0030 to 0.030 mass % of at least one selected from the group consisting of Nb, V, Mo, Ta, and W.

Effects of the Invention

According to the present invention, it is possible to effectively minimize unintentional deterioration of iron core efficiency in a wound core obtained by laminating bent steel sheets.

EMBODIMENT(S) FOR IMPLEMENTING THE INVENTION

Figure 1:
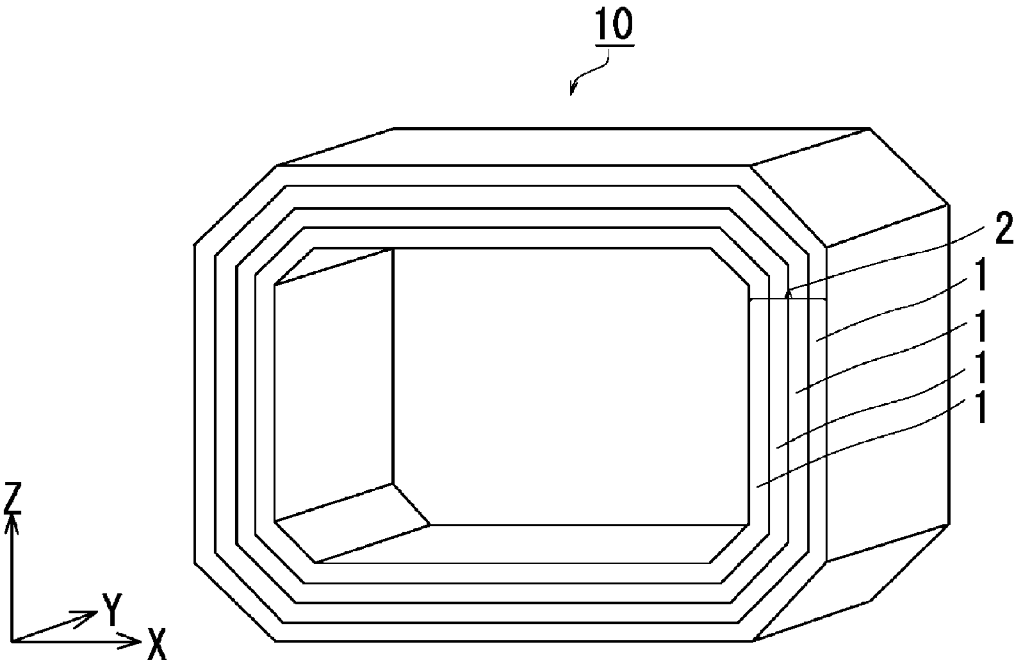
FIG. 1 is a perspective view schematically showing a wound core according to one embodiment of the present invention.

Hereinafter, a wound core according to one embodiment of the present invention will be described in detail in order. However, the present invention is not limited to only the configuration disclosed in the present embodiment, and can be variously modified without departing from the gist of the present invention. Here, lower limit values and upper limit values are included in the numerical value limiting ranges described below. Numerical values indicated by "more than" or "less than" are not included in these numerical value ranges. In addition, unless otherwise specified, "%" relating to the chemical composition means "mass %."

In addition, terms such a "parallel," "perpendicular," "identical," and "right angle" and length and angle values used in this specification to specify shapes, geometric conditions and their extents are not bound by strict meanings, and should be interpreted to include the extent to which similar functions can be expected.

In addition, in this specification, "grain-oriented electrical steel sheet" may be simply described as "steel sheet" or "electrical steel sheet" and "wound core" may be simply described as "iron core."

A wound core according to the present embodiment is a wound core including a substantially rectangular wound core main body in a side view,

- wherein the wound core main body includes a portion in which grain-oriented electrical steel sheets in which first planar portions and corner portions are alternately continuous in a longitudinal direction and the angle formed by two first planar portions adjacent to each other with each of the corner portions therebetween is 90° are stacked in a sheet thickness direction and has a substantially rectangular laminated structure in a side view
- wherein, in a side view of the grain-oriented electrical steel sheet, each of the corner portions has two or more bent portions having a curved shape and a second planar portion between the adjacent bent portions, and the sum of the bent angles of the bent portions present in one corner portion is 90°,
- the bent portion in a side view has an inner radius of curvature r of 1 mm or more and 5 mm or less,
- the grain-oriented electrical steel sheet has a chemical composition containing,
- in mass %,
- Si: 2.0 to 7.0%, with the remainder being Fe and impurities, and
- has a texture oriented in the Goss orientation, and
- in one or more of the first planar portion and the second planar portion adjacent to at least one of the bent portions, the existence frequency of subgrain boundaries in a region within 9 mm in a direction perpendicular to the boundary with the bent portion satisfies the following Formula (1):

$$(Nac+Nal)/Nt \geq 0.010 \quad (1)$$

Here, when a plurality of measurement points are arranged at intervals of 2 mm in the direction parallel to and direction vertical to the bent portion boundary in the region of the first planar portion or the second planar portion adjacent to the bent portion, Nt in Formula (1) is a total number of line segments connecting two adjacent measurement points in the parallel direction and the vertical direction.

Nac in Formula (1) is the number of line segments at which subgrain boundaries are able to be identified among the line segments direction parallel to the bent portion boundary, and Nal in Formula (1) is the number of line segments at which subgrain boundaries are able to be identified among line segments in a direction perpendicular to the bent portion boundary.

1. Shape of Wound Core and Grain-Oriented Electrical Steel Sheet

First, the shape of a wound core of the present embodiment will be described. The shapes themselves of the wound core and the grain-oriented electrical steel sheet described here are not particularly new. For example, they merely correspond to the shapes of known wound cores and grain-oriented electrical steel sheets introduced in Patent Documents 9 to 11 in the related art.

Figure 2:
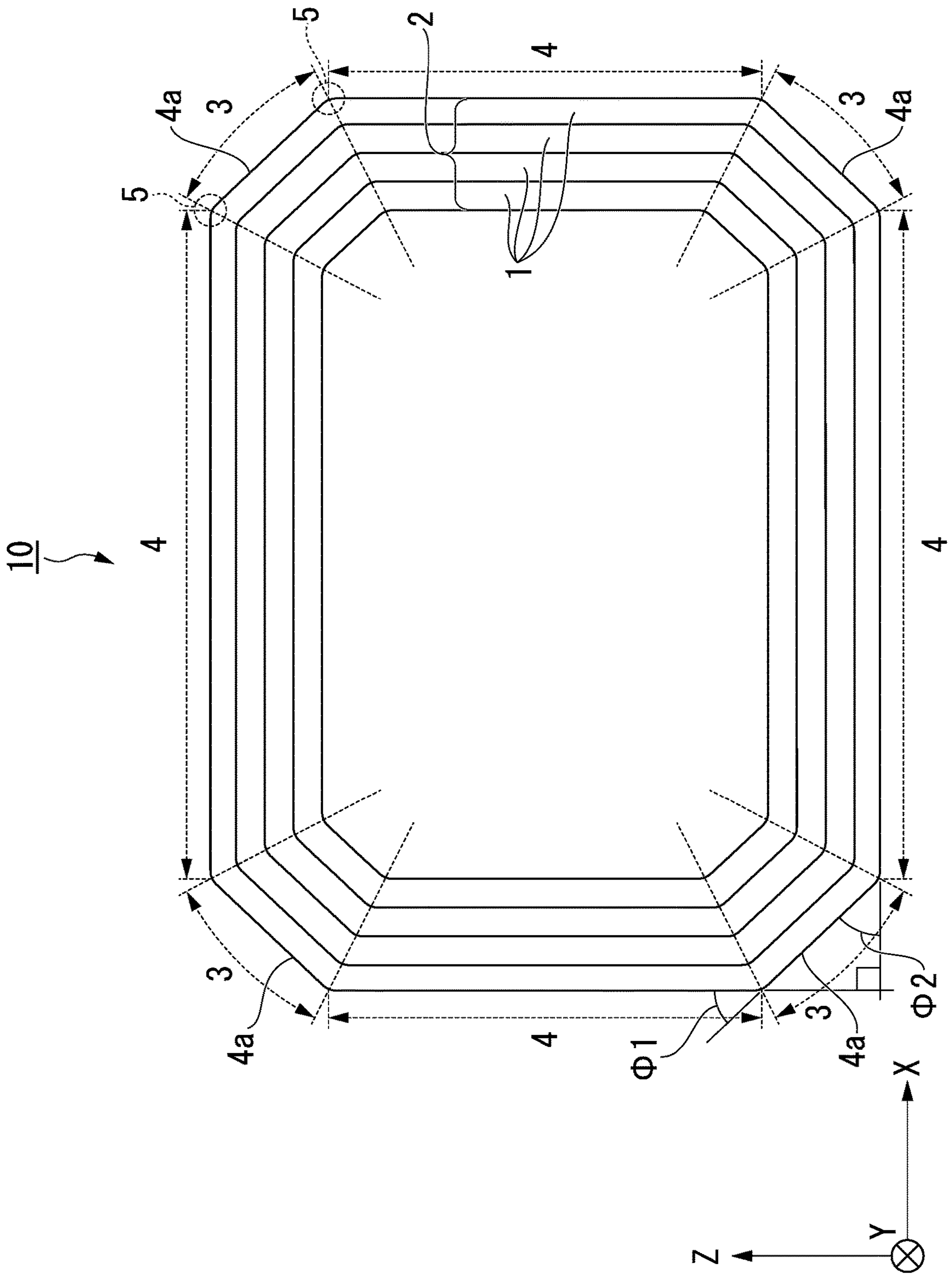
FIG. 2 is a side view of the wound core shown in the embodiment of FIG. 1.
Figure 3:
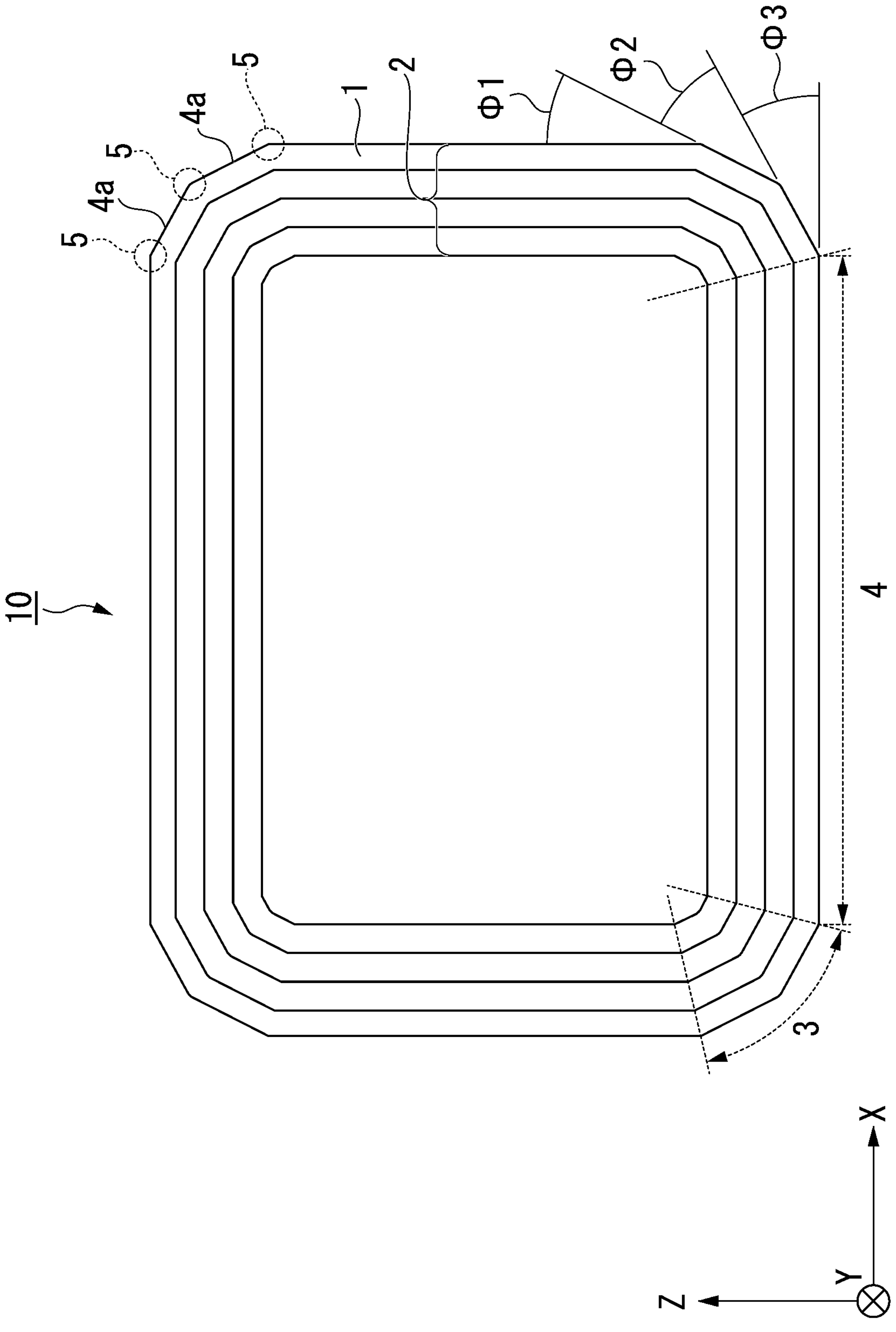
FIG. 3 is a side view schematically showing a wound core according to another embodiment of the present invention.

FIG. 1 is a perspective view schematically showing a wound core according to one embodiment. FIG. 2 is a side view of the wound core shown in the embodiment of FIG. 1. In addition, FIG. 3 is a side view schematically showing another embodiment of the wound core.

Here, in the present embodiment, the side view is a view of the elongated grain-oriented electrical steel sheet constituting the wound core in the width direction (Y-axis direction in FIG. 1). The side view is a view showing a shape visible from the side (a view in the Y-axis direction in FIG. 1).

The wound core according to the present embodiment includes a substantially rectangular (substantially polygonal) wound core main body 10 in a side view. The wound core main body 10 has a substantially rectangular laminated structure 2 in a side view in which grain-oriented electrical steel sheets 1 are stacked in a sheet thickness direction. The wound core main body 10 may be used as a wound core without change or may include, as necessary, for example, a known fastener such as a binding band for integrally fixing the plurality of stacked grain-oriented electrical steel sheets 1.

In the present embodiment, the iron core length of the wound core main body 10 is not particularly limited. Even if the iron core length of the iron core changes, because the volume of a bent portion 5 is constant, the iron loss generated in the bent portion 5 is constant. If the iron core length is longer, the volume ratio of the bent portion 5 to the wound core main body 10 is smaller and the influence on iron loss deterioration is also small. Therefore, a longer iron core length of the wound core main body 10 is preferable. The iron core length of the wound core main body 10 is preferably 1.5 m or more and more preferably 1.7 m or more. Here, in the present embodiment, the iron core length of the wound core main body 10 is the circumferential length at the central point in the laminating direction of the wound core main body 10 in a side view.

The wound core of the present embodiment can be suitably used for any conventionally known application.

As shown in FIGS. 1 and 2, the wound core main body 10 includes a portion in which the grain-oriented electrical steel sheets 1 in which first planar portions 4 and corner portions 3 are alternately continuous in the longitudinal direction and the angle formed by two adjacent first planar portions 4 at each corner portion 3 is 90° are stacked in a sheet thickness direction and has a substantially rectangular laminated structure 2 in a side view. Here, in this specification, "first planar portion" and "second planar portion" each may be simply referred to as "planar portion."

Each corner portion 3 of the grain-oriented electrical steel sheet 1 in a side view includes two or more bent portions 5 having a curved shape, and the sum of the bent angles of the bent portions 5 present in one corner portion 3 is 90°. The corner portion 3 has a second planar portion 4*a* between the adjacent bent portions 5. Therefore, the corner portion 3 has a configuration including two or more bent portions 5 and one or more second planar portions 4*a*.

The embodiment of FIG. 2 includes two bent portions 5 in one corner portion 3. The embodiment of FIG. 3 includes three bent portions 5 in one corner portion 3.

As shown in these examples, in the present embodiment, one corner portion can be formed with two or more bent portions, but in order to minimize the occurrence of distortion due to deformation during processing and minimize the iron loss, the bent angle φ of the bent portion 5 is preferably 60° or less. Specifically, for example, in FIG. 3, φ1, φ2, and φ3 are preferably 60° or less, and more preferably 45° or less.

In the embodiment of FIG. 2 including two bent portions in one corner portion, in order to reduce the iron loss, for example, φ1=60° and φ2=30° and φ1=45° and φ2=45° can be set. In addition, in the embodiment of FIG. 3 including three bent portions in one corner portion, in order to reduce the iron loss, for example, φ1=30°, φ2=30° and φ3=30° can be set. In addition, in consideration of production efficiency, since it is preferable that folding angles (bent angles) be equal, when one corner portion includes two bent portions, φ1=45° and φ2=45° are preferable, and in addition, in the embodiment of FIG. 3 including three bent portions in one corner portion, in order to reduce the iron loss, for example, φ1=30°, φ2=30° and φ3=30° are preferable.

Figure 6:
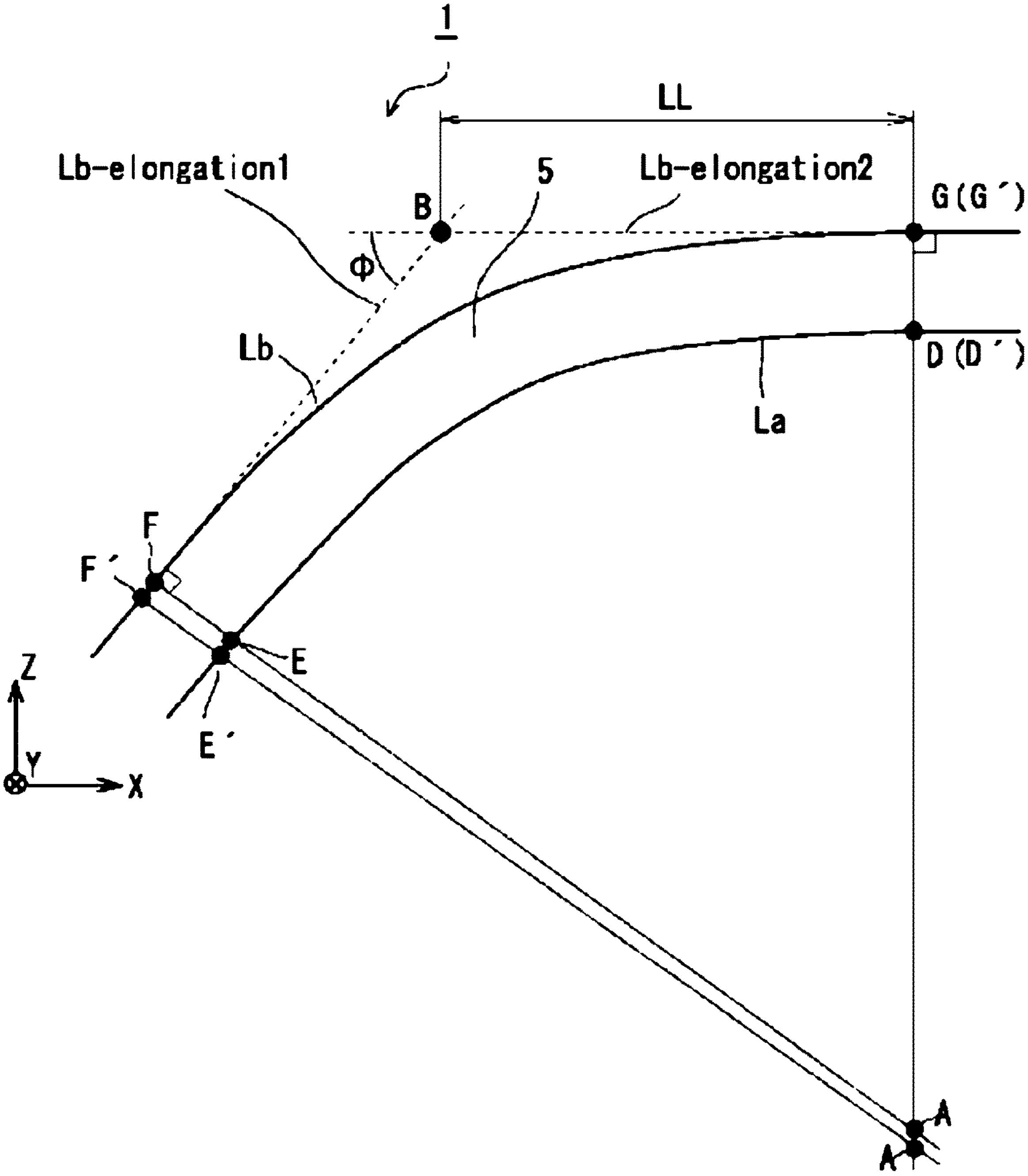
FIG. 6 is a side view schematically showing an example of a bent portion of a grain-oriented electrical steel sheet constituting the wound core according to the present invention.

The bent portion 5 will be described in more detail with reference to FIG. 6. FIG. 6 is a diagram schematically showing an example of the bent portion (curved portion) of the grain-oriented electrical steel sheet. The bent angle of the bent portion 5 is the angle difference occurring between the rear straight portion and the front straight portion in the bending direction at the bent portion 5 of the grain-oriented electrical steel sheet 1, and is expressed, on the outer surface of the grain-oriented electrical steel sheet 1, as an angle φ that is a supplementary angle of the angle formed by two virtual lines Lb-elongation1 and Lb-elongation2 obtained by extending the straight portion that are surfaces of the planar portions 4 and 4*a* on both sides of the bent portion 5. In this case, the point at which the extended straight line separates from the surface of the steel sheet is the boundary between the planar portions 4 and 4*a* and the bent portion 5 on the outer surface of the steel sheet, which is the point F and the point G in FIG. 6.

In addition, straight lines perpendicular to the outer surface of the steel sheet extend from the point F and the point G, and intersections with the inner surface of the steel sheet are the point E and the point D. The point E and the point D are the boundaries between the planar portions 4 and 4*a* and the bent portion 5 on the inner surface of the steel sheet.

Here, in the present embodiment, in a side view of the grain-oriented electrical steel sheet 1, the bent portion 5 is a portion of the grain-oriented electrical steel sheet 1 surrounded by the point D, the point E, the point F, and the point G. In FIG. 6, the surface of the steel sheet between the point D and the point E, that is, the inner surface of the bent portion 5, is indicated by La, and the surface of the steel sheet between the point F and the point G, that is, the outer surface of the bent portion 5, is indicated by Lb.

In addition, in the present embodiment, in a side view of the bent portion 5, the inner radius of curvature r of the bent portion 5 is defined. Using FIG. 6 as an example, a method of determining the inner radius of curvature r of the bent portion 5 will be described in detail. First, in each of the planar portions 4 and 4*a* on both sides of the bent portion 5, a straight line that is in contact with the straight portion which is the surface of the planar portion for at least 1 mm or more is determined. These are assumed to be virtual lines Lb-elongation1 and Lb-elongation2, and the intersection thereof is assumed to be the point B. Ideally, the length of the line segment BF and the length of the line segment BG are the same, but in reality, there may be some differences due to variations in processing conditions and unavoidable variations. In such a case, the point F' and the point G' are determined from the point B, the point F and the point G so that the effects of the present invention can be evaluated appropriately. That is, LL is a longer distance between the line segment BF and the line segment BG (for example, the line segment BG is longer than the line segment BF), a point on the virtual line Lb-elongation1 that is a distance LL away from the point B toward point F is set as the point F', and a point on the virtual line Lb-elongation2 that is a distance LL away from the point B toward the point G is set as the point G'. In this case, the point F' or the point G' matches the original point F or point G (for example, if the line segment BG is longer than the line segment BF, the point G' matches the original point G).

Here, when the lengths of the line segment BF and the line segment BG are equal, in FIG. 6, the point F' matches the original point F, and accordingly, the point E' to be described below matches the original point E.

Here, when the length of the line segment BF and the length of the line segment BG are different from each other, straight lines perpendicular to the outer surface of the steel sheet extend from the point F' and the point G', and the intersection of the two straight lines is the center of curvature A. Here, the intersections between the line segment AF' and the line segment AG' and the inner surface La of the steel sheet are the point E' and the point D', respectively. In this case, a circle centered on the point A and passing through the point E' and the point D' is a curved surface approximating the bent portion 5 in the present embodiment, and the length of the line segment AE' (which corresponds to the length of the line segment AD') is the inner radius of curvature r in the present embodiment. A smaller inner radius of curvature r indicates a sharper curvature of the curved portion of the bent portion 5, and a larger inner radius of curvature r indicates a gentler curvature of the curved portion of the bent portion 5.

In the wound core of the present embodiment, the inner radius of curvature r at each bent portion 5 of the grain-oriented electrical steel sheets 1 laminated in the sheet thickness direction may vary to some extent. This variation may be a variation due to molding accuracy, and it is conceivable that an unintended variation may occur due to handling during lamination. Such an unintended error can be minimized to about 0.3 mm or less in current general industrial production. If such a variation is large, a representative value can be obtained by measuring the inner curvature radii r of a sufficiently large number of steel sheets and averaging them. In addition, it is conceivable to change it intentionally for some reason, but the present embodiment does not exclude such a form.

In addition, in the present embodiment, it is assumed that the lengths of the line segment BF and the line segment BG are different from each other as described above, and bending is asymmetrical. In such a situation, it is considered that strain is more locally concentrated in a region on the side in which the line segment length is short and it is believed that the effects of the present invention are more effectively exhibited on the side in which the line segment length is short. However, particularly, measurement of subgrain boundaries to be described below does not need to be performed on the planar portion with a shorter line segment length, and there is no need to be conscious of whether bending is asymmetric or symmetric. This is because the strain spreads to the outside of the bent portion even on the side in which the line segment length is long, and it is clear that the effects of the present invention are exhibited in that region.

Here, the method of observing the shape of the bent portion 5 and the method of measuring the inner radius of curvature r are not particularly limited, and measurement can be performed by performing observation using, for example, a commercially available microscope (Nikon ECLIPSE LV150) at a magnification of 15 to 200. Here, in order to determine the planar portions 4 and 4*a*, imaging may be performed at a low magnification and a wide region may be observed. In addition, in order to determine the inner radius of curvature r, imaging may be performed at a high magnification, and the number of imaging may increase to obtain continuous pictures. In addition, when the inner radius of curvature r is determined, it is necessary to perform imaging at a low magnification, and when there is concern about a measurement error, it is necessary to enlarge the captured image and perform measurement.

In the present embodiment, when the inner radius of curvature r of the bent portion 5 is in a range of 1 mm or more and 5 mm or less and specific grain-oriented electrical steel sheets with a controlled coefficient of friction, which will be described below, are used, it is possible to reduce noise of the wound core. The inner radius of curvature r of the bent portion 5 is preferably 3 mm or less. In this case, the effects of the present embodiment are more significantly exhibited.

In addition, it is most preferable that all bent portions 5 present in the iron core satisfy the inner radius of curvature r specified in the present embodiment. If there are bent portions 5 that satisfy the inner radius of curvature r of the present embodiment and bent portions 5 that do not satisfy inner radius of curvature r, it is desirable for at least half or more of the bent portions 5 to satisfy the inner radius of curvature r specified in the present embodiment.

Figure 4:
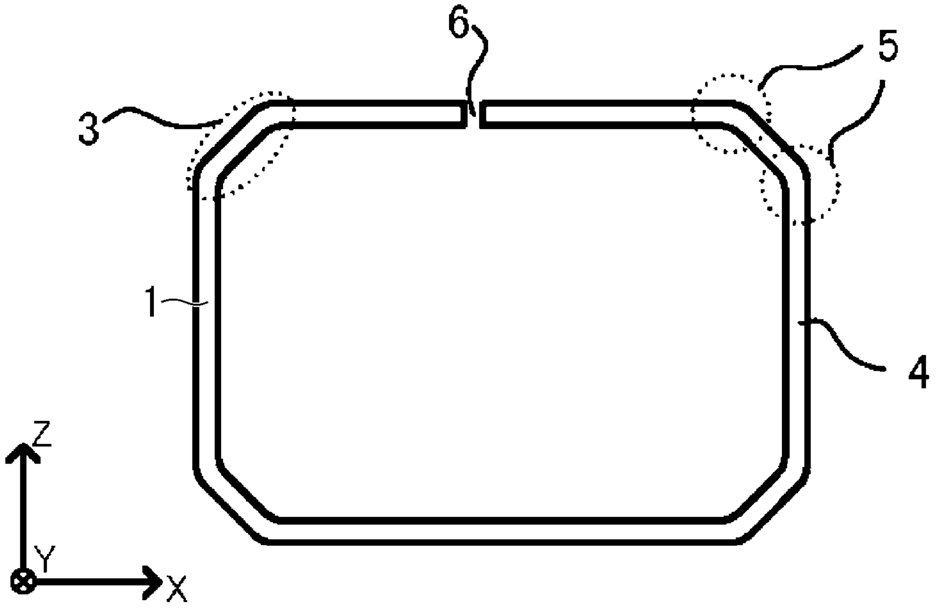
FIG. 4 is a side view schematically showing an example of a single-layer grain-oriented electrical steel sheet constituting a wound core according to the present invention.
Figure 5:
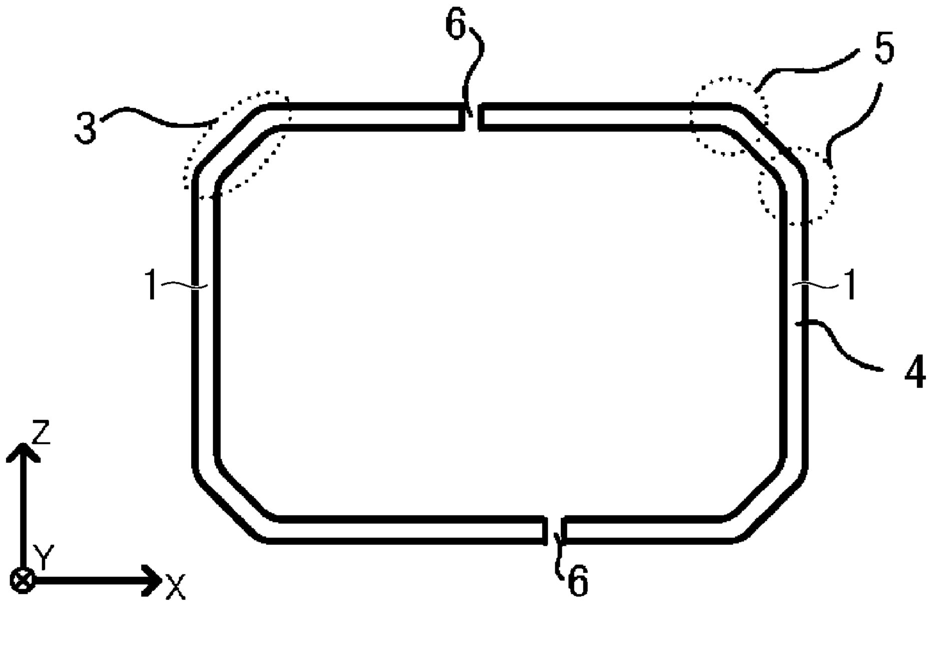
FIG. 5 is a side view schematically showing another example of a single-layer grain-oriented electrical steel sheet constituting the wound core according to the present invention.

FIG. 4 and FIG. 5 are diagrams schematically showing an example of a single-layer grain-oriented electrical steel sheet 1 in the wound core main body 10. As shown in the examples of FIG. 4 and FIG. 5, the grain-oriented electrical steel sheet 1 used in the present embodiment is bent and includes the corner portion 3 composed of two or more bent portions 5 and the first planar portion 4, and forms a substantially rectangular ring in a side view via a joining part 6 that is an end surface of one or more grain-oriented electrical steel sheets 1 in the longitudinal direction.

In the present embodiment, the entire wound core main body 10 may have a substantially rectangular laminated structure 2 in a side view. As shown in the example of FIG. 4, one grain-oriented electrical steel sheet 1 may form one layer of the wound core main body 10 via one joining part 6 (that is, one grain-oriented electrical steel sheet 1 is connected via one joining part 6 for each roll), and as shown in the example of FIG. 5, one grain-oriented electrical steel sheet 1 may form about half the circumference of the wound core, or two grain-oriented electrical steel sheets 1 may form one layer of the wound core main body 10 via two joining parts 6 (that is, two grain-oriented electrical steel sheets 1 are connected to each other via two joining parts 6 for each roll).

The sheet thickness of the grain-oriented electrical steel sheet 1 used in the present embodiment is not particularly limited, and may be appropriately selected according to applications and the like, but is generally within a range of 0.15 mm to 0.35 mm and preferably in a range of 0.18 mm to 0.23 mm.

2. Configuration of Grain-Oriented Electrical Steel Sheet

Next, the configuration of the grain-oriented electrical steel sheet 1 constituting the wound core main body 10 will be described. The present embodiment has features such as the existence frequency of subgrain boundaries in the planar portions 4 and 4*a* adjacent to the bent portion 5 of the electrical steel sheets laminated adjacently and the arrangement portion of the electrical steel sheet with a controlled existence frequency of the subgrain boundary in the iron core.

(1) Existence Frequency of Subgrain Boundaries in Planar Portion Adjacent to Bent Portion In the grain-oriented electrical steel sheet 1 constituting the wound core of the present embodiment, in at least a part of the bent portion, the existence frequency of subgrain boundaries of the laminated steel sheets is controlled such that it becomes larger. If the existence frequency of subgrain boundaries in the vicinity of the bent portion 5 is low, the effect of avoiding efficiency deterioration in the iron core having an iron core shape in the present embodiment is not exhibited. In other words, when subgrain boundaries are arranged in the vicinity of the bent portion 5, this indicates that efficiency deterioration is easily minimized.

Although a mechanism by which such a phenomenon occurs is not clear, it is speculated to be as follows.

In the iron core targeted by the present embodiment, macroscopic strain (deformation) due to bending is confined within the bent portion 5 which is a very narrow region. However, it is considered that, if elastic strain occurs due to micro strain or plastic strain, when viewed as the crystal structure inside the steel sheet, the dislocation formed at the bent portion 5 moves and spreads to the outside of the bent portion 5, that is, the planar portions 4 and 4*a*. It is generally known that dispersion of dislocations in crystals due to plastic deformation significantly deteriorates iron loss. In this case, if subgrain boundaries are arranged in the vicinity of the bent portion 5 and the subgrain boundaries are caused to function as an obstacle (dislocation elimination site) to dislocation movement to the planar portions 4 and 4*a* or an elastic strain relaxation zone, it is possible to keep dislocation due to deformation or an elastic strain distribution region very close to the bent portion 5. In the present embodiment, it is considered that a decrease in the iron core efficiency can be minimized by this operation. It should be noted here that subgrain boundaries, which are dispersed in a relatively large amount in the present embodiment, are also basically composed of a special arrangement of dislocations. It is described above that dislocations generated by deformation significantly deteriorate iron loss, but it is considered that dislocations that form subgrain boundaries are arranged to eliminate the slight orientation difference in the crystal grains and alleviate unintentional stress. In this regard, subgrain boundaries are considered to act effectively as elimination sites for dislocations due to deformation without concern of adversely influencing magnetic properties as long as the amount of is appropriate. Such a mechanism of operation of the present embodiment is considered to be a special phenomenon in the iron core having a specific shape targeted by the present embodiment and has so far hardly been considered, but can be interpreted according to the findings obtained by the inventors.

In the present embodiment, the existence frequency of subgrain boundaries is measured as follows.

In the present embodiment, the following four angles α, β, γ, and $\varphi_{3D}$ related to the crystal orientation observed in the grain-oriented electrical steel sheet 1 are used. Here, as will be described below, the angle α is a deviation angle from the ideal {110}<001> orientation (Goss orientation) with the rolling surface normal direction Z as the rotation axis, the angle β is a deviation angle from the ideal {110}<001> orientation with the direction perpendicular to the rolling direction (the sheet width direction) C as the rotation axis, and the angle γ is a deviation angle from the ideal {110}<001> orientation using the rolling direction L as the rotation axis.

Here, the "ideal {110}<001> orientation" is not the {110}<001> orientation when indicating the crystal orientation of a practical steel sheet, but an academic crystal orientation, {110}<001> orientation.

Generally, in the measurement of the crystal orientation of a recrystallized practical steel sheet, the crystal orientation is defined without strictly distinguishing an angle difference of about ±2.5°. In the case of conventional grain-oriented electrical steel sheets, an angle range of about ±2.5° centered on the geometrically strict {110}<001> orientation is defined as "{110}<001> orientation." However, in the present embodiment, it is necessary to clearly distinguish an angle difference of ±2.5° or less.

Therefore, in the present embodiment in which the {110}<001> orientation as a geometrically strict crystal orientation is defined, in order to avoid confusion with the {110}<001> orientation used in conventionally known documents and the like, "ideal {110}<001> orientation (ideal Goss orientation)" is used.

Deviation angle α: a deviation angle of the crystal orientation observed in the grain-oriented electrical steel sheet 1 from the ideal {110}<001> orientation around the rolling surface normal direction Z.

Deviation angle β: a deviation angle of the crystal orientation observed in the grain-oriented electrical steel sheet 1 from the ideal {110}<001> orientation around the direction perpendicular to the rolling direction C.

Deviation angle γ: a deviation angle of the crystal orientation observed in the grain-oriented electrical steel sheet 1 from the ideal {110}<001> orientation around the rolling direction L.

Figure 7:
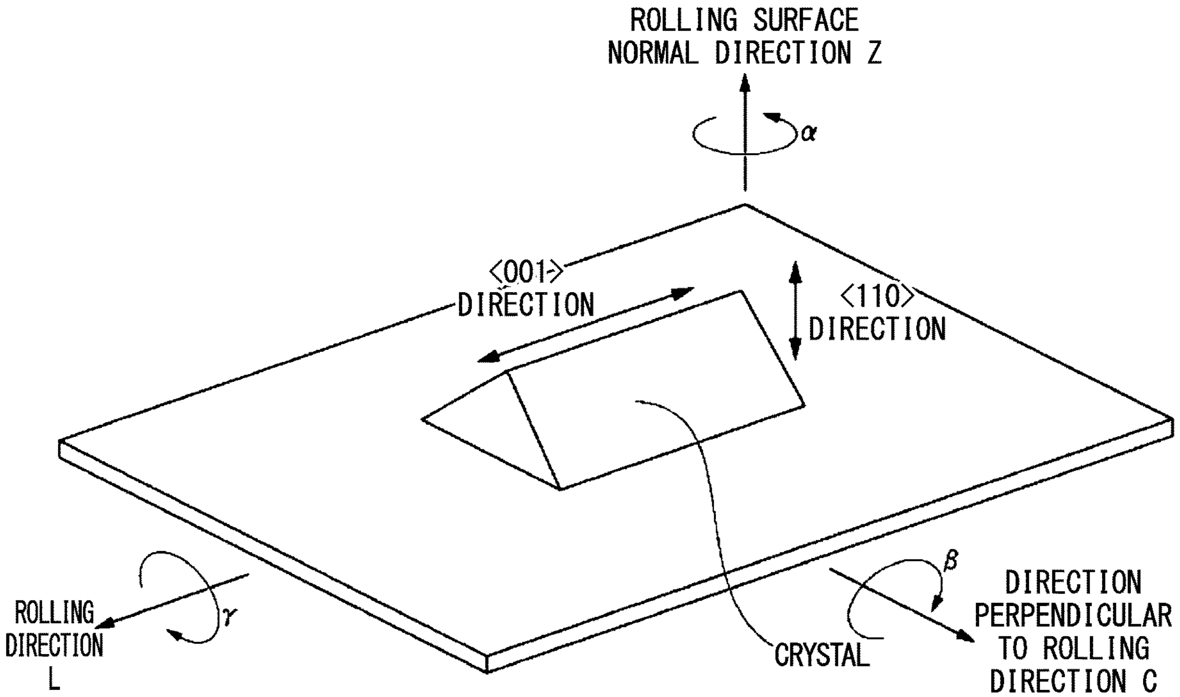
FIG. 7 is a diagram schematically illustrating deviation angles (α, β, γ) related to a crystal orientation observed in a grain-oriented electrical steel sheet.

FIG. 7 shows a schematic view of the deviation angle α, the deviation angle β, and the deviation angle γ.

Angle $\varphi_{3D}$: an angle obtained by $\varphi_{3D}=[(\alpha_2-\alpha_1)^2+(\beta_2-\beta_1)^2+(\gamma_2-\gamma_1)^2]^{1/2}$ when the deviation angles of crystal orientations measured at two measurement points adjacent to each other on the rolling surface of the grain-oriented electrical steel sheet with an interval of 2 mm are expressed as $(\alpha_1, \beta_1, \gamma_1)$ and $(\alpha_2, \beta_2, \gamma_2)$.

The angle $\varphi_{3D}$ may be described as a "spatial three-dimensional orientation difference."

Currently, the crystal orientation of the grain-oriented electrical steel sheets practically produced is controlled so that the deviation angle between the rolling direction and the <001> direction becomes about 5° or less. This control is the same for the grain-oriented electrical steel sheet 1 according to the present embodiment. Therefore, when defining the "grain boundary" of the grain-oriented electrical steel sheet, the general definition of a grain boundary (large angle grain boundary), "boundary at which the orientation difference between adjacent regions is 15° or more" cannot be applied. For example, in a conventional grain-oriented electrical steel sheet, grain boundaries are exposed by macro etching the surface of the steel sheet, and the crystal orientation difference between both side regions of the grain boundaries generally about 2 to 3°.

In the present embodiment, as will be described below, it is necessary to strictly define boundaries between crystals and crystals. Therefore, a method based on visual observation such as macro etching is not used as a grain boundary specification method.

In the present embodiment, in order to specify grain boundaries, measurement points are set on the rolling surface of the grain-oriented electrical steel sheet 1 at intervals of 2 mm, and the crystal orientation is measured for each measurement point. For example, the crystal orientation may be measured by an X-ray diffraction method (Laue method). The Laue method is a method of emitting an X-ray beam to a steel sheet and analyzing transmitted or reflected diffraction spots. By analyzing the diffraction spots, it is possible to identify the crystal orientation of a location to which an X-ray beam is emitted. If the emission position is changed and the diffraction spots are analyzed at a plurality of locations, the crystal orientation distribution of the emission positions can be measure. The Laue method is a technique suitable for measuring the crystal orientation of a metal structure having coarse crystal grains.

Figure 9:
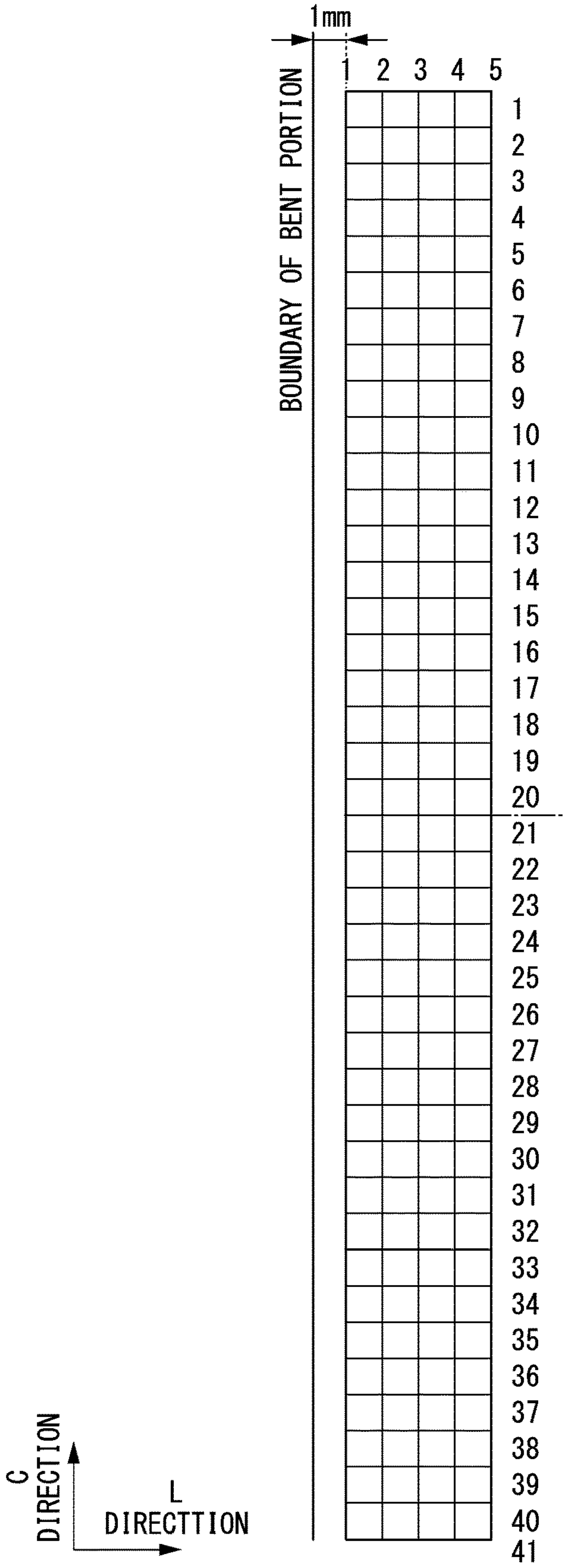
FIG. 9 is a mesh diagram illustrating a method of arranging measurement points for identifying grain boundaries in the present embodiment.

As shown in FIG. 9, measurement points in the present embodiment are arranged in a region of the planar portions 4 and 4*a* adjacent to the bent portion 5 at equal intervals (intervals of 2 mm) in a direction parallel to and direction vertical to the boundary between the bent portion 5 and the planar portions 4 and 4*a*. In the direction parallel to the boundary, a total of 41 points are arranged with 20 points on each side using the width center of the grain-oriented electrical steel sheet 1 as a starting point, and in the direction vertical to the boundary, 5 points are arranged with a point 1 mm away from the boundary as a starting point. In this manner, a total of 205 measurement points are arranged, and additionally, 205 points are measured on at least 10 steel sheets and so that a total of 2,050 points are measured. However, if the measurement point is close to the end of the steel sheet in the width direction, the error in orientation measurement increases and data tends to be abnormal so that the measurement points close to the cut end during measurement are avoided. That is, when the steel sheet width is about 80 mm or less, the number of measurement points in the direction parallel to the boundary is appropriately reduced. Here, for convenience, in FIG. 9, in order to make it easier to understand the arrangement position of the measurement points, the size ratio of each constituent element (intervals and inter-mesh distances) is shown in a ratio different from actual components. That is, the mesh diagram shown in FIG. 9 is a conceptual diagram, and does not reflect actual sizes.

Here, the size of the measurement target area in the direction perpendicular to the boundary between the bent portion 5 and the planar portions 4 and 4*a* is at most a point 9 mm from the boundary. The reason which the measurement target area is relatively short in this manner is that elastic strain generated in the bent portion 5 spreads only over a region several times larger than the size of the bent portion 5 which is a plastic strain region. Alternatively, this is because, since dislocations move at most about several times the deformation region, even if subgrain boundaries exist farther away, the function of subgrain boundaries that act as obstacles to strain relaxation and dislocation movement becomes less effective. In addition, the width of the measurement target area in the direction parallel to the boundary is about 80 mm, and is set considering that it is preferable to measure the region over the entire width of at least one crystal grain in a general grain-oriented electrical steel sheet and the efficiency of the measurement operation decreases as the number of measurement points increases. It is needless to say that, if a sufficient time is taken for measurement, it is preferable to increase the number of measurement points in the parallel direction, and it is preferable to cover the entire width of the grain-oriented electrical steel sheets laminated to form a wound core.

In addition, when it is difficult to measure the crystal orientation of the planar portions 4 and 4*a* in the vicinity of the bent portion 5, a steel sheet is cut out from the planar portions 4 and 4*a* so that it is possible to measure a region five times or more the measurement target region in the above vertical direction, and crystal orientation measurement points on the steel sheet are arranged in the parallel direction and the vertical direction at equal intervals (intervals of 2 mm). In the parallel direction, a total of 41 points are arranged with 20 points on each side using the width center of the steel sheet as a starting point, and in the vertical direction, 21 points are arranged, the crystal orientation is measured at a total of 861 points for 10 steel sheets, and a total of 8,610 points are measured. In this manner, when the average frequency of subgrain boundaries in the steel sheet as a core material is derived, it may be used as a substitute value for the crystal orientation measurement value in the vicinity of the bent portion. Of course, in order to accurately derive the average frequency of subgrain boundaries, it is also preferable to increase the number of measurement points in the vertical direction, and it is also preferable to increase the number of measurement points in the parallel direction as described above.

The above measurement is performed, and the above deviation angle α, deviation angle β, and deviation angle γ are specified for each measurement point. Based on each deviation angle at each specified measurement point, it is determined whether there is a subgrain boundary on a line segment connecting two adjacent measurement points. Specifically, in the region of the first planar portion 4 or the second planar portion 4*a* adjacent to the bent portion 5, a plurality of measurement points are arranged at intervals of 2 mm in a direction parallel to and direction vertical to the bent portion boundary which is a boundary with the bent portion 5, it is determined whether there is a subgrain boundary on a line segment connecting two adjacent measurement points.

Here, in the present embodiment, the concept of "grain boundary point" for determining whether there is a grain boundary between two measurement points and the number of grain boundaries may be defined and specified.

Specifically, when the angle $\varphi_{3D}$ for two adjacent measurement points satisfies $2.0° > \varphi_{3D} \geq 0.5°$, it is determined that there is a grain boundary point that satisfies the boundary condition BA at the center between the two points, and when $\varphi_{3D} \geq 2.0°$ is satisfied, it is determined that there is a grain boundary point that satisfies the boundary condition BB at the center between the two points.

The grain boundary that satisfies the boundary condition BA is a subgrain boundary of interest in the present embodiment. On the other hand, it can be said that the grain boundary that satisfies the boundary condition BB is substantially the same as the grain boundary of conventional secondary recrystallization grains recognized in macro etching.

Grain boundary points are determined for each line segment connecting two points adjacent in the parallel direction and the vertical direction. That is, points adjacent in the oblique direction are not determined. When 41 measurement points are set in the parallel direction and 5 measurement points are set in the vertical direction, and 10 steel sheets are measured, grain boundary points are determined at 3,640 locations (that is, a total number of line segments is 3,640). Here, the total number of locations where the grain boundary point is determined (a total number of line segments) is set as Nt (3,640 in the above measurement). Between two points adjacent to a direction (the width direction in the grain-oriented electrical steel sheet 1) parallel to the boundary of the bent portion 5, the number of grain boundary points that satisfy the boundary condition BA is set as Nac, and the number of grain boundary points that satisfy the boundary condition BB is set as Nbc. That is, among the line segments in a direction parallel to the bent portion boundary, the number of line segments at which subgrain boundaries are able to be identified is set as Nac, and the number of line segments at which subgrain boundaries are not able to be identified is set as Nbc. In addition, between two points adjacent to a direction (the rolling direction in the grain-oriented electrical steel sheet 1) perpendicular to the boundary of the bent portion 5, the number of grain boundary points that satisfy the boundary condition BA is set as Nal, and the number of grain boundary points that satisfy the boundary condition BB is set as Nbl. That is, among the line segments in a direction perpendicular to the bent portion boundary, the number of line segments at which subgrain boundaries are able to be identified is set as Nal, and the number of line segments at which subgrain boundaries are not able to be identified is set as Nbl.

In the grain-oriented electrical steel sheet 1 according to the present embodiment, when grain boundaries that satisfy the boundary condition BA are allowed to exist at a relatively high frequency compared to grain boundaries that satisfy the boundary condition BB, it is possible to effectively eliminate dislocations that are generated in the bent portion 5 and move to the region of the planar portions 4 and 4*a*, and cause elastic strain to be relaxed. As a result, the iron core efficiency is improved.

It should be noted that the grain boundary that satisfies the boundary condition BB, that is, a conventionally recognized general grain boundary, also has the dislocation elimination effect. In other words, even if there is no grain boundary that satisfies the boundary condition BA, the dislocation elimination effect can be expected according to the grain boundary that satisfies the boundary condition BB. For example, if crystal grain sizes are made finer and the number of grain boundary points that satisfy the boundary condition BB increases, the dislocation elimination effect is exhibited to some extent. However, in this case, there is concern that magnetic properties may deteriorate due to fine grains. In order to clarify a feature in which subgrain boundaries more effectively eliminate dislocations than conventional general grain boundaries, in the present embodiment, the presence of a certain number or more of grain boundary points that satisfy the boundary condition BA is set as an essential condition.

In the wound core according to the present embodiment, in the planar portions 4 and 4*a* in the vicinity of at least one bent portion 5 of any laminated grain-oriented electrical steel sheet 1, the following Formula (1) is satisfied.

$$(Nac+Nal)/Nt \geq 0.010 \quad (1)$$

The numerator on the left side in Formula (1) is a sum of grain boundary points at which subgrain boundaries are identified in the measurement region, the definition in Formula (1) corresponds to the basic feature of the mechanism described above. That is, the left side ((Nac+Nal)/Nt) in the above (1) is an index indicating the existence density of subgrain boundaries per unit area, and in the wound core of the present embodiment, it is important for securing the existence density in the vicinity of the bent portion 5 to a certain level or more. When Formula (1) is satisfied, the subgrain boundary becomes an obstacle to movement of dislocations generated in the bent portion 5 toward the planar portions 4 and 4*a*, and the effect of the present invention is exhibited. The left side in Formula (1) is preferably 0.030 or more and more preferably 0.050 or more. In addition, it is needless to say that it is preferable to satisfy Formula (1) in all the planar portions 4 and 4*a* adjacent to the bent portion 5 present in the wound core.

As another embodiment, in the planar portions 4 and 4*a* in the vicinity of at least one bent portion 5 of any laminated grain-oriented electrical steel sheet 1, the following Formula (2) is additionally satisfied.

$$(Nac+Nal)/(Nbc+Nbl) > 0.30 \quad (2)$$

This expression particularly corresponds to a feature in which subgrain boundaries are more likely to act as an obstacle to dislocation movement than general grain boundaries, and corresponds to one preferable aspect of the present embodiment. When Formula (2) is satisfied, it is possible to sufficiently minimize movement of dislocations to the planar portion region. The left side in Formula (2) is preferably 0.80 or more and more preferably 1.80 or more. In addition, it is needless to say that it is preferable to satisfy Formula (2) in all the planar portions 4 and 4*a* adjacent to the bent portion 5 present in the wound core.

As still another embodiment, in the planar portions 4 and 4*a* in the vicinity of at least one bent portion 5 of any laminated grain-oriented electrical steel sheet 1, the following Formula (3) is additionally satisfied.

$$Nal/Nac \geq 0.80 \quad (3)$$

In consideration of the mechanism described above, this expression particularly corresponds to a feature in which subgrain boundaries intersecting the direction toward the planar portions 4 and 4*a* (the direction perpendicular to the boundary of the bent portion 5) act as obstacles to movement of dislocations in the direction of the planar portions 4 and 4*a* more easily than subgrain boundaries that are parallel to the direction toward the planar portions 4 and 4*a* (the direction perpendicular to the boundary of the bent portion 5). When Formula (3) is satisfied, it is possible to sufficiently minimize movement of dislocations to the planar portion region. The left side in Formula (3) is preferably 1.0 or more and more preferably 1.5 or more. In addition, it is needless to say that it is preferable to satisfy Formula (3) in all the planar portions 4 and 4*a* adjacent to the bent portion 5 present in the wound core.

(2) Grain-Oriented Electrical Steel Sheet

As described above, in the grain-oriented electrical steel sheet 1 used in the present embodiment, the base steel sheet is a steel sheet in which crystal grain orientations in the base steel sheet are highly concentrated in the {110}<001> orientation and has excellent magnetic properties in the rolling direction.

A known grain-oriented electrical steel sheet can be used as the base steel sheet in the present embodiment. Hereinafter, an example of a preferable base steel sheet will be described.

The base steel sheet has a chemical composition containing, in mass %, Si: 2.0% to 6.0%, with the remainder being Fe and impurities. This chemical composition allows the crystal orientation to be controlled to the Goss texture concentrated in the {110}<001> orientation and favorable magnetic properties to be secured. Other elements are not particularly limited, but in the present embodiment, in addition to Si, Fe and impurities, the following selective elements may be contained. For example, it is allowed to contain the following elements in the following ranges in place of some Fe. The ranges of the contents of representative selective elements are as follows.

C: 0 to 0.0050%,
Mn: 0 to 1.0%,
S: 0 to 0.0150%,
Se: 0 to 0.0150%,
Al: 0 to 0.0650%,
N: 0 to 0.0050%,
Cu: 0 to 0.40%,
Bi: 0 to 0.010%,
B: 0 to 0.080%,
P: 0 to 0.50%,
Ti: 0 to 0.0150%,
Sn: 0 to 0.10%,
Sb: 0 to 0.10%,
Cr: 0 to 0.30%,
Ni: 0 to 1.0%,
Nb: 0 to 0.030%,
V: 0 to 0.030%,
Mo: 0 to 0.030%,
Ta: 0 to 0.030%,
W: 0 to 0.030%.

Since these selective elements may be contained depending on the purpose, there is no need to limit the lower limit value, and it is not necessary to substantially contain them. In addition, even if these selective elements are contained as impurities, the effects of the present embodiment are not impaired. In addition, since it is difficult to make the C content 0% in a practical steel sheet in production, the C content may exceed 0%. In addition, among these selective elements, Nb, V, Mo, Ta, W, particularly Nb, are known to be elements that influence the form of inhibitors in the grain-oriented electrical steel sheet and act to increase the existence frequency of subgrain boundaries, and can be said to be elements that should be actively utilized in the present embodiment. When the effect of increasing the subgrain boundary frequency is expected, it is preferable to contain at least one selected from the group consisting of Nb, V, Mo, Ta, and W in a total content of 0.0030 to 0.030 mass %. Here, impurities refer to elements that are unintentionally contained, and elements that are mixed in from raw materials such as ores, scraps, or production environments when the base steel sheet is industrially produced. The upper limit of the total content of impurities may be, for example, 5%.

The chemical component of the base steel sheet may be measured by a general analysis method for steel. For example, the chemical component of the base steel sheet may be measured using Inductively Coupled Plasma-Atomic Emission Spectrometry (ICP-AES). Specifically, for example, a 35 mm square test piece is acquired from the center position of the base steel sheet after the coating is removed, and it can be specified by performing measurement under conditions based on a previously created calibration curve using ICPS-8100 or the like (measurement device) (commercially available from Shimadzu Corporation). Here, C and S may be measured using a combustion-infrared absorption method, and N may be measured using an inert gas fusion-thermal conductivity method.

Here, the above chemical composition is the component of the grain-oriented electrical steel sheet 1 as a base steel sheet. When the grain-oriented electrical steel sheet 1 as a measurement sample has a primary coating made of an oxide or the like (a glass film and an intermediate layer), an insulation coating or the like on the surface, this coating is removed by the following method, and the chemical composition is then measured.

For example, as a method of removing an insulation coating, a grain-oriented electrical steel sheet having a coating may be immersed in an alkaline solution at a high temperature. Specifically, the grain-oriented electrical steel sheet is immersed in an aqueous sodium hydroxide solution containing NaOH: 30 to 50 mass %+$H_2O$: 50 to 70 mass % at 80 to 90° C. for 5 to 10 minutes, then washed with water and dried, and thus the insulation coating can be removed from the grain-oriented electrical steel sheet. Here, the time for immersion in the aqueous sodium hydroxide solution may change depending on the thickness of the insulation coating.

In addition, for example, as a method of removing an intermediate layer, an electrical steel sheet from which an insulation coating is removed may be immersed in hydrochloric acid at a high temperature. Specifically, the concentration of hydrochloric acid suitable for removing the intermediate layer to be dissolved is determined in advance and the sheet is immersed in hydrochloric acid with this concentration, for example, 30 to 40 mass % hydrochloric acid, at 80 to 90° C. for 1 to 5 minutes, then washed with water and dried, and thus the intermediate layer can be removed. Generally, respective coatings are removed using different treatment solutions, such as using an alkaline solution for removing the insulation coating and hydrochloric acid for removing the intermediate layer.

(3) Method of Producing Grain-Oriented Electrical Steel Sheet

The method of producing the grain-oriented electrical steel sheet 1, which is a base steel sheet, is not particularly limited, and as will be described below, when a finish annealing process is precisely controlled, it is possible to intentionally create grain boundaries (grain boundaries that divide secondary recrystallization grains) that satisfy the boundary condition BA but do not satisfy the boundary condition BB. When a wound core is produced using such grain-oriented electrical steel sheets having grain boundaries (grain boundaries that divide secondary recrystallization grains) that satisfy the boundary condition BA but do not satisfy the boundary condition BB, it is possible to obtain a wound core that can minimize efficiency deterioration in the iron core. In addition, the grain boundaries (grain boundaries that divide secondary recrystallization grains) that satisfy the boundary condition BA but do not satisfy the boundary condition BB can exhibit a strong effect of alleviating strain during iron core processing. Therefore, during baking and annealing of the insulation coating, the cooling rate from 800° C. to 500° C. is preferably 60° C./sec or less and more preferably 50° C./sec or less. In addition, the lower limit of the cooling rate is not particularly limited, but considering that deterioration of productivity, the cooling capacity of the furnace body, and the length of the cooling zone are not excessively large, in reality, the lower limit is preferably 10° C./sec or more and more preferably 20° C./sec or more.

In the finish annealing process, specifically, when a total content of Nb, V, Mo, Ta, and W in the chemical composition of the slab is 0.0030 to 0.030%, in a heating procedure, it is preferable to control at least one of setting $PH_2O/PH_2$ at 700 to 800° C. to 0.030 to 5.0, setting $PH_2O/PH_2$ at 900 to 950° C. to 0.010 to 0.20, setting $PH_2O/PH_2$ at 950 to 1,000° C. to 0.005 to 0.10, and setting $PH_2O/PH_2$ at 1,000 to 1,050° C. to 0.0010 to 0.050. In this case, in addition, it is preferable to control at least one of setting the retention time at 950 to 1,000° C. to 150 minutes or more and setting the retention time at 1,000 to 1,050° C. to 150 minutes or more.

In addition, the retention time at 1,050 to 1,100° C. is preferably 300 minutes or more.

On the other hand, when a total content of Nb, V, Mo, Ta, and W in the chemical composition of the slab is not 0.0030 to 0.030%, in a heating procedure, it is preferable to control at least one of setting $PH_2O/PH_2$ at 700 to 800° C. to 0.030 to 5.0, setting $PH_2O/PH_2$ at 900 to 950° C. to 0.010 to 0.20, setting $PH_2O/PH_2$ at 950 to 1,000° C. to 0.0050 to 0.10, and setting $PH_2O/PH_2$ at 1,000 to 1,050° C. to 0.0010 to 0.050. In this case, in addition, it is preferable to control at least one of setting the retention time at 950 to 1,000° C. to 300 minutes or more and the retention time at 1,000 to 1,050° C. to 300 minutes or more.

In addition, the retention time at 1,050 to 1,100° C. is preferably 300 minutes or more.

In addition, in the heating procedure of the finish annealing process, it is more preferable to cause secondary recrystallization while applying a temperature gradient of more than 0.5° C./cm in a boundary portion between the primary recrystallization region and the secondary recrystallization region in the steel sheet. For example, it is preferable to apply the above temperature gradient to the steel sheet while secondary recrystallization grains grow within a temperature range of 800° C. to 1,150° C. in the heating procedure of finish annealing. In addition, the direction in which the temperature gradient is applied is preferably the direction perpendicular to the rolling direction C.

The above $PH_2O/PH_2$ is called an oxygen potential, and is a ratio between the water vapor partial pressure $PH_2O$ and the hydrogen partial pressure $PH_2$ in an atmosphere gas.

Specific examples of a preferable production method include, for example, a method in which a slab containing 0.04 to 0.1 mass % of C, with the remainder being the chemical composition of the base steel sheet, is heated to 1,000° C. or higher and hot-rolled and hot-band annealing is then performed as necessary, and a cold-rolled steel sheet is then obtained by cold-rolling, once, twice or more with intermediate annealing, the cold-rolled steel sheet is heated, decarburized and annealed, for example, at 700 to 900° C. in a wet hydrogen-inert gas atmosphere, and as necessary, nitridation annealing is additionally performed, an annealing separator is applied, finish annealing is then performed at about 1,000° C., and an insulation coating is formed at about 900° C. In addition, after that, a coating or the like may be provided to adjust the dynamic friction coefficient and the static friction coefficient.

In addition, generally, the effects of the present embodiment can be obtained even with a steel sheet that has been subjected to a treatment called "magnetic domain control" in the steel sheet producing process by a known method.

Subgrain boundaries, which is a feature of the grain-oriented electrical steel sheet 1 used in the present embodiment, are adjusted by the treatment atmosphere and the retention time for each finish annealing temperature range, for example, as disclosed in Patent Document 7. This method is not particularly limited, and a known method may be appropriately used. When the formation frequency of subgrain boundaries of the entire steel sheet increases in this manner, even if the bent portion 5 is formed at an arbitrary position when a wound core is produced, the above formulae are expected to be satisfied in the wound core. In addition, in order to produce a wound core in which many subgrain boundaries are arranged in the vicinity of the bent portion 5, a method of controlling the bending position of the steel sheet so that a location where the subgrain boundary frequency is high is arranged in the vicinity of the bent portion 5 is also effective. In this method, a steel sheet in which, when a steel sheet is produced, the grain growth of secondary recrystallization varies locally according to a known method such as locally changing the primary recrystallized structure, nitriding conditions, and the annealing separator application state is produced, and bending may be performed by selecting a location where the subgrain boundary frequency increases.

3. Method of Producing Wound Core

The method of producing a wound core according to the present embodiment is not particularly limited as long as the wound core according to the present embodiment can be produced, and for example, a method according to a known wound core introduced in Patent Documents 9 to 11 in the related art may be applied. In particular, it can be said that the method using a production device UNICORE (commercially available from AEM UNICORE) (https://www.aemcores.com.au/technology/unicore/) is optimal.

In addition, according to a known method, as necessary, a heat treatment may be performed. In addition, the obtained wound core main body 10 may be used as a wound core without change or a plurality of stacked grain-oriented electrical steel sheets 1 may be fixed, as necessary, using a known fastener such as a binding band to form a wound core.

The present embodiment is not limited to the above embodiment. The above embodiment is an example, and any embodiment having substantially the same configuration as the technical idea described in the claims of the present invention and exhibiting the same operational effects is included in the technical scope of the present invention.

EXAMPLES

Hereinafter, technical details of the present invention will be additionally described with reference to examples of the present invention. The conditions in the examples shown below are examples of conditions used for confirming the feasibility and effects of the present invention, and the present invention is not limited to these condition examples. In addition, the present invention may use various conditions without departing from the gist of the present invention as long as the object of the present invention is achieved.

(Grain-Oriented Electrical Steel Sheet)

Using a slab having components (mass %, the remainder other than the displayed elements is Fe) shown in Table 1 as a material, a grain-oriented electrical steel sheet (product sheet) having components (mass %, the remainder other than the displayed elements is Fe) and a sheet thickness t (μm)) shown in Table 2 was produced. Here, for finish annealing conditions, finish annealing conditions described in Patent Document 7 were used, and the subgrain boundary frequency in the vicinity of the bent portion was changed. In Table 1 and Table 2, "-" means that the element was not controlled or produced with awareness of content and its content was not measured.

TABLE 1

| Steel | Chemical composition of slab (steel sheet) (unit: mass %, remainder: Fe and impurities) | | | | | | | | | | | | |
|---|---|---|---|---|---|---|---|---|---|---|---|---|---|
| type | C | Si | Mn | S | Al | N | Cu | Bi | Nb | V | Mo | Ta | W |
| A | 0.080 | 3.25 | 0.07 | 0.0240 | 0.027 | 0.008 | 0.07 | — | — | — | — | — | — |
| B | 0.080 | 3.25 | 0.07 | 0.0230 | 0.026 | 0.008 | 0.07 | 0.002 | — | — | — | — | — |
| C | 0.060 | 3.40 | 0.10 | 0.0065 | 0.027 | 0.008 | 0.20 | — | 0.006 | — | — | — | — |
| D | 0.060 | 3.30 | 0.10 | 0.0065 | 0.027 | 0.008 | 0.02 | — | 0.002 | — | — | — | — |
| E | 0.070 | 3.26 | 0.07 | 0.0250 | 0.026 | 0.008 | 0.07 | — | — | — | — | — | — |
| F | 0.070 | 3.26 | 0.07 | 0.0250 | 0.026 | 0.008 | 0.07 | — | 0.007 | — | — | — | — |
| G | 0.070 | 3.26 | 0.07 | 0.0250 | 0.026 | 0.008 | 0.07 | 0.002 | — | — | — | — | — |
| H | 0.070 | 3.26 | 0.07 | 0.0250 | 0.026 | 0.008 | 0.07 | 0.002 | 0.007 | — | — | — | — |
| I | 0.060 | 3.35 | 0.10 | 0.0060 | 0.026 | 0.008 | 0.02 | — | 0.010 | — | — | — | — |
| J | 0.060 | 3.35 | 0.10 | 0.0060 | 0.026 | 0.008 | 0.02 | — | 0.020 | — | — | — | — |
| K | 0.060 | 3.35 | 0.10 | 0.0060 | 0.026 | 0.008 | 0.02 | — | 0.030 | — | — | — | — |
| L | 0.060 | 3.45 | 0.10 | 0.0060 | 0.028 | 0.008 | 0.20 | — | 0.002 | — | — | — | — |
| M | 0.060 | 3.45 | 0.10 | 0.0060 | 0.028 | 0.008 | 0.20 | — | 0.007 | — | — | — | — |
| N | 0.060 | 3.45 | 0.10 | 0.0060 | 0.027 | 0.008 | 0.20 | — | — | 0.007 | — | — | — |
| O | 0.060 | 3.45 | 0.10 | 0.0060 | 0.027 | 0.008 | 0.20 | — | — | — | 0.020 | — | — |
| P | 0.060 | 3.45 | 0.10 | 0.0060 | 0.027 | 0.008 | 0.20 | — | 0.005 | — | — | 0.003 | — |
| Q | 0.060 | 3.45 | 0.10 | 0.0060 | 0.027 | 0.008 | 0.20 | — | — | — | — | 0.010 | — |
| R | 0.060 | 3.45 | 0.10 | 0.0060 | 0.027 | 0.008 | 0.20 | — | — | — | — | — | 0.010 |
| S | 0.060 | 3.45 | 0.10 | 0.0060 | 0.027 | 0.008 | 0.20 | — | 0.004 | — | 0.010 | — | — |
| T | 0.060 | 3.45 | 0.10 | 0.0060 | 0.027 | 0.008 | 0.20 | — | 0.005 | 0.003 | — | 0.003 | — |

TABLE 2

| Steel | Chemical composition of slab (steel sheet) (unit: mass %, remainder: Fe and impurities) | | | | | | | | | | | | | Sheet thickness |
|---|---|---|---|---|---|---|---|---|---|---|---|---|---|---|
| type | C | Si | Mn | S | Al | N | Cu | Bi | Nb | V | Mo | Ta | W | t (mm) |
| A1 | 0.001 | 3.15 | 0.07 | <0.002 | <0.004 | <0.002 | 0.07 | — | — | — | — | — | — | 220 |
| B1 | 0.001 | 3.15 | 0.07 | <0.002 | <0.004 | <0.002 | 0.07 | <0.001 | — | — | — | — | — | 190 |
| C1 | 0.001 | 3.30 | 0.10 | <0.002 | <0.004 | <0.002 | 0.20 | — | 0.005 | — | — | — | — | 220 |
| D1 | 0.001 | 3.20 | 0.10 | <0.002 | <0.004 | <0.002 | 0.02 | — | 0.001 | — | — | — | — | 260 |
| E1 | 0.001 | 3.15 | 0.07 | <0.002 | <0.004 | <0.002 | 0.07 | — | — | — | — | — | — | 260 |
| F1 | 0.001 | 3.15 | 0.07 | <0.002 | <0.004 | <0.002 | 0.07 | — | 0.005 | — | — | — | — | 220 |
| G1 | 0.001 | 3.15 | 0.07 | <0.002 | <0.004 | <0.002 | 0.07 | <0.001 | — | — | — | — | — | 220 |
| H1 | 0.001 | 3.15 | 0.07 | <0.002 | <0.004 | <0.002 | 0.07 | <0.001 | 0.005 | — | — | — | — | 190 |
| I1 | 0.001 | 3.30 | 0.10 | <0.002 | <0.004 | <0.002 | 0.02 | — | 0.007 | — | — | — | — | 220 |
| J1 | 0.002 | 3.30 | 0.10 | <0.002 | <0.004 | <0.002 | 0.02 | — | 0.018 | — | — | — | — | 220 |
| K1 | 0.004 | 3.30 | 0.10 | <0.002 | <0.004 | <0.002 | 0.02 | — | 0.028 | — | — | — | — | 220 |
| L1 | 0.001 | 3.34 | 0.10 | <0.002 | <0.004 | <0.002 | 0.20 | — | 0.002 | — | — | — | — | 190 |
| M1 | 0.001 | 3.34 | 0.10 | <0.002 | <0.004 | <0.002 | 0.20 | — | 0.006 | — | — | — | — | 190 |
| N1 | 0.001 | 3.30 | 0.10 | <0.002 | <0.004 | <0.002 | 0.02 | — | — | 0.006 | — | — | — | 190 |
| O1 | 0.001 | 3.34 | 0.10 | <0.002 | <0.004 | <0.002 | 0.02 | — | — | — | 0.020 | — | — | 190 |
| P1 | 0.001 | 3.34 | 0.10 | <0.002 | <0.004 | <0.002 | 0.20 | — | 0.004 | — | — | 0.001 | — | 190 |
| Q1 | 0.001 | 3.34 | 0.10 | <0.002 | <0.004 | <0.002 | 0.02 | — | — | — | — | 0.010 | — | 190 |
| R1 | 0.001 | 3.34 | 0.10 | <0.002 | <0.004 | <0.002 | 0.02 | — | — | — | — | — | 0.010 | 190 |
| S1 | 0.001 | 3.34 | 0.10 | <0.002 | <0.004 | <0.002 | 0.20 | — | 0.003 | — | 0.003 | — | — | 190 |
| T1 | 0.001 | 3.34 | 0.10 | <0.002 | <0.004 | <0.002 | 0.20 | — | 0.003 | 0.001 | — | 0.002 | — | 190 |

(Evaluation Method)

(1) Subgrain Boundary Frequency

For steel sheets (steel types A1 to D1) produced by the above method, in an 8 mm×80 mm region in the region in the vicinity of the bent portion, as described above, a total of 205 crystal orientation measurement points were arranged at intervals of 2 mm, and the crystal orientations were measured. In addition, the measurement was performed for 10 steel sheets, and based on the obtained measurement results at a total of 2,050 points, the grain boundary point between adjacent measurement points was determined at 3640 locations, and Nac, Nal, Nbc, Nbl and the like were obtained.

(2) Magnetic Properties of Grain-Oriented Electrical Steel Sheet

The magnetic properties of the grain-oriented electrical steel sheet 1 were measured based on a single sheet magnetic property test method (Single Sheet Tester: SST) specified in JIS C 2556: 2015.

As the magnetic properties, the magnetic flux density B8(T) of the steel sheet in the rolling direction when excited at 800 A/m and the iron loss value of the steel sheet at an excitation magnetic flux density of 1.7 T and a frequency of 50 Hz were measured.

(3) Efficiency of Iron Core

Figure 8:
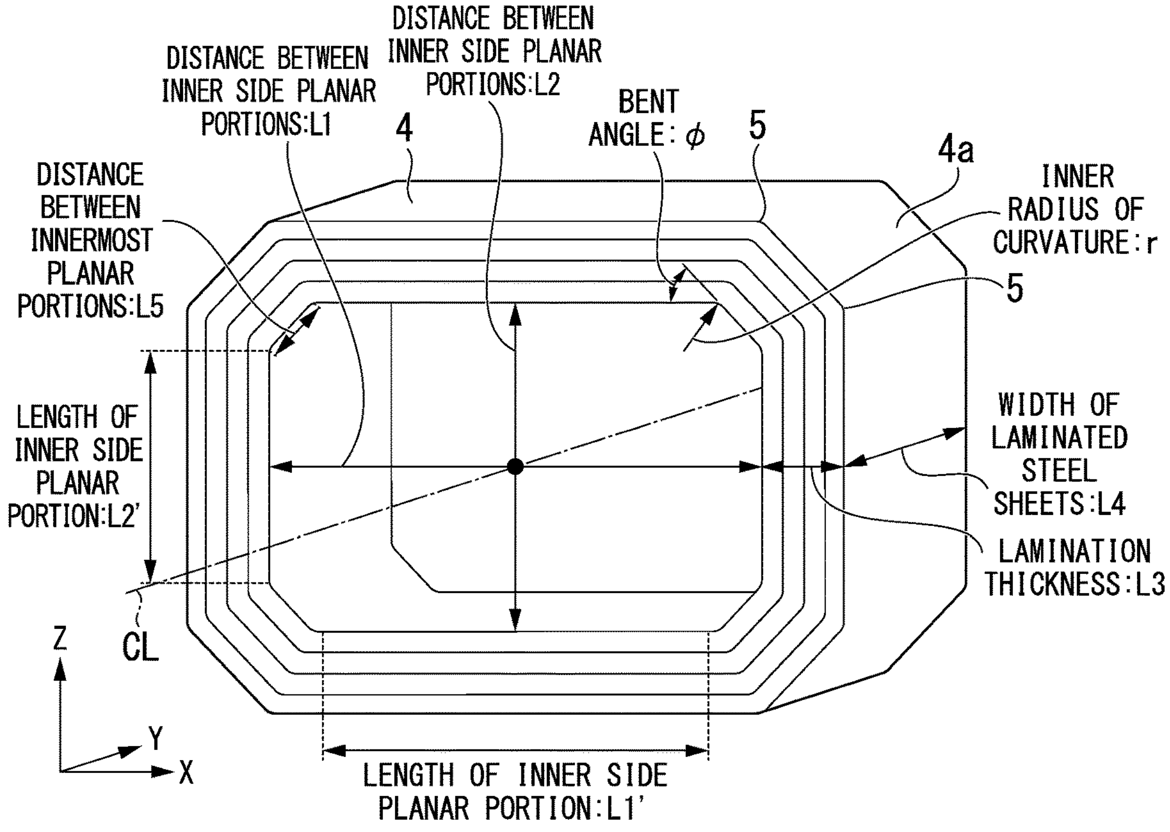
FIG. 8 is a schematic view showing size parameters of a wound core produced in an example.

The wound cores of the cores Nos. a to c having shapes shown in Table 3 and FIG. 8 were produced using respective steel sheets as materials. Here, L1 is parallel to the X-axis direction and is a distance between parallel grain-oriented electrical steel sheets 1 on the innermost periphery of the wound core in a flat cross section including the center CL (a distance between inner side planar portions). L1' is parallel to the X-axis direction and is a length of the first planar portion 4 of the grain-oriented electrical steel sheet 1 on the innermost periphery (a distance between inner side planar portions). L2 is parallel to the Z-axis direction and is a distance between parallel grain-oriented electrical steel sheets 1 on the innermost periphery of the wound core in a vertical cross section including the center CL (a distance between inner side planar portions). L2' is parallel to the Z-axis direction and is a length of the first planar portion 4 of the grain-oriented electrical steel sheet 1 on the innermost periphery (a distance between inner side planar portions). L3 is parallel to the X-axis direction and is a lamination thickness of the wound core in a flat cross section including the center CL (a thickness in the laminating direction). L4 is parallel to the X-axis direction and is a width of the laminated steel sheets of the wound core in a flat cross section including the center CL. L5 is a distance between planar portions that are adjacent to each other in the innermost portion of the wound core and arranged to form a right angle together (a distance between bent portions). In other words, L5 is a length of the planar portion **4*a* in the longitudinal direction having the shortest length among the planar portions 4 and 4*a* of the grain-oriented electrical steel sheet 1 on the innermost periphery. r is the radius of curvature of the bent portion 5 on the inner side of the wound core, and φ is the bent angle of the bent portion 5** of the wound core.

The iron loss of the obtained wound core was measured, and an iron core efficiency commonly called building factor (BF) calculated as a ratio of these iron losses was measured. Here, the BF is a value obtained by dividing the iron loss value of the wound core by the iron loss value of the grain-oriented electrical steel sheet which is a material of the wound core. A smaller BF indicates a lower iron loss of the wound core with respect to the material steel sheet. Here, in this example, when the BF was 1.12 or less, it was evaluated that deterioration of iron loss efficiency was minimized.

TABLE 3

| Core No. | L1' (mm) | L2' (mm) | L3 (mm) | L4 (mm) | L5 (mm) | r (mm) | φ (°) |
|---|---|---|---|---|---|---|---|
| a | 200 | 65 | 50 | 150 | 4 | 2 | 45 |
| b | 300 | 100 | 80 | 150 | 4 | 2 to 10 | 45 |
| c | 350 | 280 | 120 | 150 | 4 | 1 | 45 |

Example 1; Nos. 1 to 6

Using a steel type A1, the subgrain boundary frequency was changed depending on the finish annealing atmosphere and heat cycle conditions to produce steel sheets A1-(1 to 6), the wound core of the core No. a was produced, and the iron core efficiency was evaluated.

Example 2; Nos. 7 to 12

Using a steel type B1, the heating rate during decarburization annealing was set to 50 to 400° C./s and the crystal grain size was partially changed to produce steel sheets B1-(1 to 6), the wound core of the core No. b was produced, and the iron core efficiency was evaluated.

Example 3; Nos. 13 to 25

Using a steel type C1, the subgrain boundary frequency was significantly changed depending on the finish annealing atmosphere and temperature gradient conditions to produce steel sheets C1-(1 to 9), the wound core of the core No. b having a different bent shape (inner radius of curvature r) in C1-8 was produced, and the iron core efficiency was evaluated (mainly, the difference in the influence on the magnitude of the subgrain boundary frequency and the bending form was evaluated).

Example 4; Nos. 26 to 36

Using a steel type D1, the subgrain boundary frequency was significantly changed depending on the finish annealing atmosphere and temperature gradient conditions to produce steel sheets D1-(1 to 11), the wound core of the core No. c was produced, and the iron core efficiency was evaluated (mainly, the difference in the influence on the magnitude of the subgrain boundary frequency and the bending form was evaluated).

Example 5; Nos. 37 to 52

Using steel types E1 to T1, the subgrain boundary frequency was significantly changed depending on the finish annealing atmosphere, the retention time, and the temperature gradient conditions to produce steel sheets, wound cores of cores Nos. a to c were produced, and the iron core efficiency was evaluated.

Here, Table 4 shows the iron core efficiency evaluation results in Example 1 to Example 3. Here, in "determination" of Formulae (1) to (3) in Table 4, the notation "O" means that the formula is satisfied, and the notation "x" means that the formula is not satisfied.

TABLE 4A

| No. | Steel type | Core No. | r (mm) | Hot rolling: Heating temperature ° C. | Hot rolling: Finishing temperature ° C. | Hot rolling: Winding temperature ° C. | Hot rolling: Sheet thickness mm | Hot-band annealing: Temperature ° C. | Hot-band annealing: Time sec | Cold rolling: Sheet thickness mm | Cold rolling: Total cold rolling rate % | After decarburization annealing: Primary recrystallized grain size (μm) | Nitriding treatment: Amount of N after nitriding (ppm) |
|---|---|---|---|---|---|---|---|---|---|---|---|---|---|
| 1 | A1-1 | a | 2 | 1400 | 1100 | 500 | 2.3 | 1100 | 180 | 0.22 | 90.4 | 9 | — |
| 2 | A1-2 | a | 2 | 1400 | 1100 | 500 | 2.3 | 1100 | 180 | 0.22 | 90.4 | 9 | — |
| 3 | A1-3 | a | 2 | 1400 | 1100 | 500 | 2.3 | 1100 | 180 | 0.22 | 90.4 | 9 | — |
| 4 | A1-4 | a | 2 | 1400 | 1100 | 500 | 2.3 | 1100 | 180 | 0.22 | 90.4 | 9 | — |
| 5 | A1-5 | a | 2 | 1400 | 1100 | 500 | 2.3 | 1100 | 180 | 0.22 | 90.4 | 9 | — |
| 6 | A1-6 | a | 2 | 1400 | 1100 | 500 | 2.3 | 1100 | 180 | 0.22 | 90.4 | 9 | — |
| 7 | B1-1 | b | 2 | 1350 | 1100 | 500 | 2.3 | 1100 | 180 | 0.19 | 91.7 | 10 | — |
| 8 | B1-2 | b | 2 | 1350 | 1100 | 500 | 2.3 | 1100 | 180 | 0.19 | 91.7 | 10 | — |
| 9 | B1-3 | b | 2 | 1350 | 1100 | 500 | 2.3 | 1100 | 180 | 0.19 | 91.7 | 10 | — |
| 10 | B1-4 | b | 2 | 1350 | 1100 | 500 | 2.3 | 1100 | 180 | 0.19 | 91.7 | 10 | — |
| 11 | B1-5 | b | 2 | 1350 | 1100 | 500 | 2.3 | 1100 | 180 | 0.19 | 91.7 | 10 | — |
| 12 | B1-6 | b | 2 | 1350 | 1100 | 500 | 2.3 | 1100 | 180 | 0.19 | 91.7 | 10 | — |
| 13 | C1-1 | b | 2 | 1100 | 900 | 550 | 2.6 | 1100 | 150 | 0.22 | 91.5 | 16 | 210 |
| 14 | C1-2 | b | 2 | 1100 | 900 | 550 | 2.6 | 1100 | 150 | 0.22 | 91.5 | 16 | 210 |
| 15 | C1-3 | b | 2 | 1100 | 900 | 550 | 2.6 | 1100 | 150 | 0.22 | 91.5 | 16 | 210 |
| 16 | C1-4 | b | 2 | 1100 | 900 | 550 | 2.6 | 1100 | 150 | 0.22 | 91.5 | 16 | 210 |
| 17 | C1-5 | b | 2 | 1100 | 900 | 550 | 2.6 | 1100 | 150 | 0.22 | 91.5 | 16 | 210 |

TABLE 4B

| No. | Steel type | Core No. | r (mm) | Hot rolling: Heating temperature ° C. | Hot rolling: Finishing temperature ° C. | Hot rolling: Winding temperature ° C. | Hot rolling: Sheet thickness mm | Hot-band annealing: Temperature ° C. | Hot-band annealing: Time sec | Cold rolling: Sheet thickness mm | Cold rolling: Total cold rolling rate % | After decarburization annealing: Primary recrystallized grain size (μm) | Nitriding treatment: Amount of N after nitriding (ppm) |
|---|---|---|---|---|---|---|---|---|---|---|---|---|---|
| 18 | C1-6 | b | 2 | 1100 | 900 | 550 | 2.6 | 1100 | 150 | 0.22 | 91.5 | 16 | 210 |
| 19 | C1-7 | b | 2 | 1100 | 900 | 550 | 2.6 | 1100 | 150 | 0.22 | 91.5 | 16 | 210 |
| 20 | C1-8 | b | 2 | 1100 | 900 | 550 | 2.6 | 1100 | 150 | 0.22 | 91.5 | 16 | 210 |
| 21 | C1-8 | b | 3 | 1100 | 900 | 550 | 2.6 | 1100 | 150 | 0.22 | 91.5 | 16 | 210 |
| 22 | C1-8 | b | 5 | 1100 | 900 | 550 | 2.6 | 1100 | 150 | 0.22 | 91.5 | 16 | 210 |

TABLE 4B-continued

| | | | | Hot rolling | | | | Hot-band annealing | | Cold rolling | | After decarburization annealing | Nitriding treatment |
|---|---|---|---|---|---|---|---|---|---|---|---|---|---|
| No. | Steel type | Core No. | r (mm) | Heating temperature ° C. | Finishing temperature ° C. | Winding temperature ° C. | Sheet thickness mm | Temperature ° C. | Time sec | Sheet thickness mm | Total cold rolling rate % | Primary recrystallized grain size (μm) | Amount of N after nitriding (ppm) |
| 23 | C1-8 | b | 6 | 1100 | 900 | 550 | 2.6 | 1100 | 150 | 0.22 | 91.5 | 16 | 210 |
| 24 | C1-8 | b | 10 | 1100 | 900 | 550 | 2.6 | 1100 | 150 | 0.22 | 91.5 | 16 | 210 |
| 25 | C1-9 | b | 2 | 1100 | 900 | 550 | 2.6 | 1100 | 150 | 0.22 | 91.5 | 16 | 210 |
| 26 | D1-1 | c | 1 | 1150 | 900 | 550 | 2.8 | 1100 | 150 | 0.26 | 90.7 | 22 | 230 |
| 27 | D1-2 | c | 1 | 1150 | 900 | 550 | 2.8 | 1100 | 150 | 0.26 | 90.7 | 22 | 230 |
| 28 | D1-3 | c | 1 | 1150 | 900 | 550 | 2.8 | 1100 | 150 | 0.26 | 90.7 | 22 | 230 |
| 29 | D1-4 | c | 1 | 1150 | 900 | 550 | 2.8 | 1100 | 150 | 0.26 | 90.7 | 22 | 230 |
| 30 | D1-5 | c | 1 | 1150 | 900 | 550 | 2.8 | 1100 | 150 | 0.26 | 90.7 | 22 | 230 |
| 31 | D1-6 | c | 1 | 1150 | 900 | 550 | 2.8 | 1100 | 150 | 0.26 | 90.7 | 22 | 230 |
| 32 | D1-7 | c | 1 | 1150 | 900 | 550 | 2.8 | 1100 | 150 | 0.26 | 90.7 | 22 | 230 |
| 33 | D1-8 | c | 1 | 1150 | 900 | 550 | 2.8 | 1100 | 150 | 0.26 | 90.7 | 22 | 230 |
| 34 | D1-9 | c | 1 | 1150 | 900 | 550 | 2.8 | 1100 | 150 | 0.26 | 90.7 | 22 | 230 |

TABLE 4C

| | | | | Hot rolling | | | | Hot-band annealing | | Cold rolling | | After decarburization annealing | Nitriding treatment |
|---|---|---|---|---|---|---|---|---|---|---|---|---|---|
| No. | Steel type | Core No. | r (mm) | Heating temperature ° C. | Finishing temperature ° C. | Winding temperature ° C. | Sheet thickness mm | Temperature ° C. | Time sec | Sheet thickness mm | Total cold rolling rate % | Primary recrystallized grain size (μm) | Amount of N after nitriding (ppm) |
| 35 | D1-10 | c | 1 | 1150 | 900 | 550 | 2.8 | 1100 | 150 | 0.26 | 90.7 | 22 | 230 |
| 36 | D1-11 | c | 1 | 1150 | 900 | 550 | 2.8 | 1100 | 150 | 0.26 | 90.7 | 22 | 230 |
| 37 | E1 | a | 1 | 1400 | 1100 | 500 | 2.6 | 1100 | 150 | 0.26 | 90.0 | 9 | — |
| 38 | H1 | b | 1 | 1400 | 1100 | 500 | 2.3 | 1100 | 150 | 0.22 | 90.4 | 7 | — |
| 39 | G1 | c | 1 | 1350 | 1100 | 500 | 2.3 | 1100 | 150 | 0.22 | 90.4 | 10 | — |
| 40 | H1 | c | 1 | 1350 | 1100 | 500 | 2.0 | 1100 | 150 | 0.19 | 90.5 | 8 | — |
| 41 | I1 | c | 1 | 1120 | 1100 | 500 | 2.6 | 1100 | 150 | 0.22 | 91.5 | 16 | 215 |
| 42 | J1 | c | 1 | 1120 | 1100 | 500 | 2.6 | 1100 | 150 | 0.22 | 91.5 | 15 | 215 |
| 43 | K1 | c | 1 | 1120 | 1100 | 500 | 2.0 | 1100 | 150 | 0.22 | 91.5 | 13 | 215 |
| 44 | T1 | c | 1 | 1120 | 1100 | 500 | 2.0 | 1100 | 150 | 0.19 | 90.5 | 24 | 215 |
| 45 | M1 | c | 1 | 1120 | 1100 | 500 | 2.0 | 1100 | 150 | 0.19 | 90.5 | 17 | 215 |
| 46 | N1 | c | 1 | 1120 | 1100 | 500 | 2.0 | 1100 | 150 | 0.19 | 90.5 | 22 | 215 |
| 47 | O1 | c | 1 | 1120 | 1100 | 500 | 2.0 | 1100 | 150 | 0.19 | 90.5 | 19 | 215 |
| 48 | P1 | c | 1 | 1120 | 1100 | 500 | 2.0 | 1100 | 150 | 0.19 | 90.5 | 15 | 215 |
| 49 | Q1 | c | 1 | 1120 | 1100 | 500 | 2.0 | 1100 | 150 | 0.19 | 90.5 | 15 | 215 |
| 50 | R1 | c | 1 | 1120 | 1100 | 500 | 2.0 | 1100 | 150 | 0.19 | 90.5 | 23 | 215 |
| 51 | S1 | c | 1 | 1120 | 1100 | 500 | 2.0 | 1100 | 150 | 0.19 | 90.5 | 17 | 215 |
| 52 | T1 | c | 1 | 1120 | 1100 | 500 | 2.0 | 1100 | 150 | 0.19 | 90.5 | 15 | 215 |

TABLE 4D

| | | Finish annealing atmosphere | | | | Finish annealing retention time | | | | | |
|---|---|---|---|---|---|---|---|---|---|---|---|
| No. | Steel type | 700 to 800° C. $PH_2O/PH_2$ | 900 to 950° C. $PH_2O/PH_2$ | 950 to 1000° C. $PH_2O/PH_2$ | 1000 to 1050° C. $PH_2O/PH_2$ | 950 to 1000° C. hr. | 1000 to 1050° C. hr. | 1050 to 1100° C. hr. | Temperature gradient ° C./cm | B8 (T) | W17/50 (W/kg) |
| 1 | A1-1 | 0.05 | 0.015 | 0.003 | 0.0007 | 2.5 | 2.5 | 7.0 | — | 1.907 | 0.854 |
| 2 | A1-2 | 0.05 | 0.020 | 0.003 | 0.0010 | 3.0 | 3.0 | 7.0 | — | 1.912 | 0.841 |
| 3 | A1-3 | 0.10 | 0.020 | 0.003 | 0.0010 | 5.0 | 5.0 | 10.0 | — | 1.916 | 0.836 |
| 4 | A1-4 | 0.10 | 0.020 | 0.003 | 0.0010 | 5.0 | 5.0 | 10.0 | — | 1.920 | 0.821 |
| 5 | A1-5 | 0.20 | 0.015 | 0.003 | 0.0050 | 5.0 | 5.0 | 10.0 | — | 1.922 | 0.814 |
| 6 | A1-6 | 0.30 | 0.020 | 0.01 | 0.0007 | 5.0 | 5.0 | 10.0 | — | 1.923 | 0.811 |
| 7 | B1-1 | 2.0 | 0.025 | 0.015 | 0.0030 | 1.3 | 5.0 | 7.0 | — | 1.918 | 0.798 |
| 8 | B1-2 | 1.0 | 0.025 | 0.015 | 0.010 | 5.0 | 5.0 | 7.0 | — | 1.926 | 0.772 |
| 9 | B1-3 | 0.80 | 0.025 | 0.015 | 0.010 | 5.0 | 5.0 | 7.0 | — | 1.928 | 0.765 |
| 10 | B1-4 | 0.70 | 0.025 | 0.015 | 0.010 | 5.0 | 10.0 | 10.0 | — | 1.934 | 0.762 |
| 11 | B1-5 | 0.60 | 0.025 | 0.015 | 0.010 | 5.0 | 10.0 | 10.0 | — | 1.938 | 0.758 |

TABLE 4D-continued

| No. | Steel type | Finish annealing atmosphere 700 to 800° C. $PH_2O/PH_2$ | 900 to 950° C. $PH_2O/PH_2$ | 950 to 1000° C. $PH_2O/PH_2$ | 1000 to 1050° C. $PH_2O/PH_2$ | Finish annealing retention time 950 to 1000° C. hr. | 1000 to 1050° C. hr. | 1050 to 1100° C. hr. | Temperature gradient ° C./cm | B8 (T) | W17/50 (W/kg) |
|---|---|---|---|---|---|---|---|---|---|---|---|
| 12 | B1-6 | 0.50 | 0.025 | 0.015 | 0.010 | 5.0 | 10.0 | 10.0 | — | 1.942 | 0.751 |
| 13 | C1-1 | 0.05 | 0.030 | 0.007 | 0.0030 | — | — | — | 0.5 | 1.923 | 0.820 |
| 14 | C1-2 | 0.1 | 0.030 | 0.02 | 0.010 | — | — | — | 0.7 | 1.937 | 0.792 |
| 15 | C1-3 | 0.2 | 0.030 | 0.02 | 0.010 | — | — | — | 0.7 | 1.941 | 0.787 |
| 16 | C1-4 | 0.4 | 0.060 | 0.02 | 0.010 | — | — | — | 0.7 | 1.943 | 0.782 |
| 17 | C1-5 | 0.4 | 0.060 | 0.02 | 0.010 | — | — | — | 1 | 1.946 | 0.778 |

TABLE 4E

| No. | Steel type | Finish annealing atmosphere 700 to 800° C. $PH_2O/PH_2$ | 900 to 950° C. $PH_2O/PH_2$ | 950 to 1000° C. $PH_2O/PH_2$ | 1000 to 1050° C. $PH_2O/PH_2$ | Finish annealing retention time 950 to 1000° C. hr. | 1000 to 1050° C. hr. | 1050 to 1100° C. hr. | Temperature gradient ° C./cm | B8 (T) | W17/50 (W/kg) |
|---|---|---|---|---|---|---|---|---|---|---|---|
| 18 | C1-6 | 0.4 | 0.060 | 0.02 | 0.010 | — | — | — | 2 | 1.948 | 0.772 |
| 19 | C1-7 | 0.4 | 0.060 | 0.02 | 0.010 | — | — | — | 3 | 1.955 | 0.765 |
| 20 | C1-8 | 0.4 | 0.060 | 0.02 | 0.010 | — | — | — | 5 | 1.971 | 0.747 |
| 21 | C1-8 | 0.4 | 0.060 | 0.02 | 0.010 | — | — | — | 5 | 1.971 | 0.747 |
| 22 | C1-8 | 0.4 | 0.060 | 0.02 | 0.010 | — | — | — | 5 | 1.971 | 0.747 |
| 23 | C1-8 | 0.4 | 0.060 | 0.02 | 0.010 | — | — | — | 5 | 1.971 | 0.747 |
| 24 | C1-8 | 0.4 | 0.060 | 0.02 | 0.010 | — | — | — | 5 | 1.971 | 0.747 |
| 25 | C1-9 | 0.4 | 0.060 | 0.02 | 0.010 | — | — | — | 7 | 1.981 | 0.721 |
| 26 | D1-1 | 0.02 | 0.003 | 0.002 | 0.0005 | — | — | — | 0.5 | 1.921 | 0.887 |
| 27 | D1-2 | 0.03 | 0.003 | 0.002 | 0.001 | — | — | — | 0.5 | 1.928 | 0.873 |
| 28 | D1-3 | 0.03 | 0.003 | 0.002 | 0.003 | — | — | — | 1 | 1.932 | 0.872 |
| 29 | D1-4 | 0.1 | 0.020 | 0.002 | 0.003 | — | — | — | 1 | 1.935 | 0.865 |
| 30 | D1-5 | 0.2 | 0.030 | 0.003 | 0.0007 | — | — | — | 0.5 | 1.931 | 0.878 |
| 31 | D1-6 | 0.4 | 0.030 | 0.02 | 0.005 | — | — | — | 0.2 | 1.925 | 0.871 |
| 32 | D1-7 | 0.4 | 0.040 | 0.03 | 0.010 | — | — | — | 1 | 1.947 | 0.830 |
| 33 | D1-8 | 0.4 | 0.040 | 0.03 | 0.010 | — | — | — | 2 | 1.955 | 0.813 |
| 34 | D1-9 | 0.4 | 0.040 | 0.03 | 0.010 | — | — | — | 3 | 1.963 | 0.794 |

TABLE 4F

| No. | Steel type | Finish annealing atmosphere 700 to 800° C. $PH_2O/PH_2$ | 900 to 950° C. $PH_2O/PH_2$ | 950 to 1000° C. $PH_2O/PH_2$ | 1000 to 1050° C. $PH_2O/PH_2$ | Finish annealing retention time 950 to 1000° C. hr. | 1000 to 1050° C. hr. | 1050 to 1100° C. hr. | Temperature gradient ° C./cm | B8 (T) | W17/50 (W/kg) |
|---|---|---|---|---|---|---|---|---|---|---|---|
| 35 | D1-10 | 0.4 | 0.040 | 0.03 | 0.010 | — | — | — | 4 | 1.971 | 0.786 |
| 36 | D1-11 | 0.4 | 0.040 | 0.03 | 0.010 | — | — | — | 8 | 1.977 | 0.772 |
| 37 | E1 | 0.3 | 0.010 | 0.005 | 0.003 | 5 | 5 | 8 | — | 1.931 | 0.813 |
| 38 | F1 | 0.3 | 0.010 | 0.005 | 0.003 | 5 | 5 | 8 | — | 1.925 | 0.731 |
| 39 | G1 | 0.1 | 0.020 | 0.005 | 0.003 | 5 | 5 | 8 | — | 1.941 | 0.682 |
| 40 | H1 | 2.0 | 0.020 | 0.005 | 0.003 | 5 | 5 | 8 | — | 1.938 | 0.648 |
| 41 | I1 | 0.3 | 0.010 | 0.005 | 0.003 | 3 | 5 | 8 | — | 1.942 | 0.681 |
| 42 | J1 | 0.3 | 0.010 | 0.005 | 0.003 | 3 | 5 | 8 | — | 1.941 | 0.667 |
| 43 | K1 | 0.3 | 0.010 | 0.005 | 0.003 | 3 | 5 | 8 | — | 1.932 | 0.692 |
| 44 | L1 | 0.3 | 0.02 | 0.005 | 0.003 | 5 | 5 | 8 | — | 1.932 | 0.660 |
| 45 | M1 | 0.05 | 0.005 | 0.003 | 0.002 | 2.5 | 5 | 8 | — | 1.949 | 0.621 |
| 46 | N1 | 0.05 | 0.005 | 0.003 | 0.002 | 2.5 | 5 | 8 | — | 1.926 | 0.650 |
| 47 | O1 | 0.05 | 0.005 | 0.003 | 0.002 | 2.5 | 5 | 8 | — | 1.944 | 0.644 |
| 48 | P1 | 0.05 | 0.005 | 0.003 | 0.002 | 2.5 | 5 | 8 | — | 1.951 | 0.632 |
| 49 | Q1 | 0.05 | 0.005 | 0.003 | 0.002 | 2.5 | 5 | 8 | — | 1.951 | 0.626 |
| 50 | R1 | 0.05 | 0.005 | 0.003 | 0.002 | 2.5 | 5 | 8 | — | 1.924 | 0.664 |
| 51 | S1 | 0.05 | 0.005 | 0.003 | 0.002 | 2.5 | 5 | 8 | — | 1.949 | 0.628 |
| 52 | T1 | 0.05 | 0.005 | 0.003 | 0.002 | 2.5 | 5 | 8 | — | 1.951 | 0.617 |

TABLE 4G

| No. | Steel type | Nal | Nac | Nbl | Nbc | (Nal + Nac)/ Nt | Determination Formula (1) | (Nal + Nac)/ (Nbl + Nbc) | Determination Formula (2) | Nal/ Nac | Determination Formula (3) | BF | Note |
|---|---|---|---|---|---|---|---|---|---|---|---|---|---|
| 1 | A1-1 | 8 | 13 | 216 | 247 | 0.006 | x | 0.05 | x | 0.62 | x | 1.18 | Comparative Example |
| 2 | A1-2 | 10 | 15 | 192 | 209 | 0.007 | x | 0.06 | x | 0.67 | x | 1.17 | Comparative Example |
| 3 | A1-3 | 16 | 23 | 148 | 174 | 0.011 | ○ | 0.12 | x | 0.70 | x | 1.11 | Example of invention |
| 4 | A1-4 | 22 | 27 | 117 | 141 | 0.013 | ○ | 0.19 | x | 0.81 | ○ | 1.10 | Example of invention |
| 5 | A1-5 | 28 | 3 | 88 | 108 | 0.017 | ○ | 0.32 | ○ | 0.80 | ○ | 1.09 | Example of invention |
| 6 | A1-6 | 35 | 40 | 80 | 99 | 0.021 | ○ | 0.42 | ○ | 0.88 | ○ | 1.08 | Example of invention |
| 7 | B1-1 | 14 | 20 | 149 | 175 | 0.009 | x | 0.10 | x | 0.70 | x | 1.16 | Comparative Example |
| 8 | B1-2 | 20 | 28 | 130 | 169 | 0.013 | ○ | 0.16 | x | 0.71 | x | 1.12 | Example of invention |
| 9 | B1-3 | 23 | 32 | 114 | 132 | 0.015 | ○ | 0.22 | x | 0.72 | x | 1.12 | Example of invention |
| 10 | B1-4 | 31 | 38 | 82 | 98 | 0.019 | ○ | 0.38 | ○ | 0.82 | ○ | 1.10 | Example of invention |
| 11 | B1-5 | 36 | 43 | 50 | 61 | 0.022 | ○ | 0.71 | ○ | 0.84 | ○ | 1.08 | Example of invention |
| 12 | B1-6 | 44 | 53 | 41 | 57 | 0.027 | ○ | 0.99 | ○ | 0.83 | ○ | 1.07 | Example of invention |
| 13 | C1-1 | 13 | 17 | 152 | 186 | 0.008 | x | 0.09 | x | 0.76 | x | 1.17 | Comparative Example |
| 14 | C1-2 | 21 | 28 | 84 | 72 | 0.013 | ○ | 0.31 | ○ | 0.75 | x | 1.10 | Example of invention |
| 15 | C1-3 | 32 | 40 | 42 | 5 | 0.020 | ○ | 0.77 | ○ | 0.80 | ○ | 1.09 | Example of invention |
| 16 | C1-4 | 66 | 169 | 134 | 40 | 0.065 | ○ | 1.35 | ○ | 0.39 | x | 1.08 | Example of invention |
| 17 | C1-5 | 75 | 160 | 117 | 37 | 0.065 | ○ | 1.53 | ○ | 0.47 | x | 1.08 | Example of invention |

TABLE 4H

| No. | Steel type | Nal | Nac | Nbl | Nbc | (Nal + Nac)/ Nt | Determination Formula (1) | (Nal + Nac)/ (Nbl + Nbc) | Determination Formula (2) | Nal/ Nac | Determination Formula (3) | BF | Note |
|---|---|---|---|---|---|---|---|---|---|---|---|---|---|
| 18 | C1-6 | 124 | 166 | 92 | 21 | 0.080 | ○ | 2.57 | ○ | 0.75 | x | 1.07 | Example of invention |
| 19 | C1-7 | 160 | 159 | 72 | 13 | 0.088 | ○ | 3.75 | ○ | 1.01 | ○ | 1.06 | Example of invention |
| 20 | C1-8 | 218 | 122 | 41 | 6 | 0.093 | ○ | 7.23 | ○ | 1.79 | ○ | 1.05 | Example of invention |
| 21 | C1-8 | 218 | 122 | 41 | 6 | 0.093 | ○ | 7.23 | ○ | 1.79 | ○ | 1.07 | Example of invention |
| 22 | C1-8 | 218 | 122 | 41 | 6 | 0.093 | ○ | 7.23 | ○ | 1.79 | ○ | 1.10 | Example of invention |
| 23 | C1-8 | 218 | 122 | 41 | 6 | 0.093 | ○ | 7.23 | ○ | 1.79 | ○ | 1.13 | Comparative Example |
| 24 | C1-8 | 218 | 122 | 41 | 6 | 0.093 | ○ | 7.23 | ○ | 1.79 | ○ | 1.16 | Comparative Example |
| 25 | C1-9 | 276 | 69 | 24 | 6 | 0.095 | ○ | 11.50 | ○ | 4.00 | ○ | 1.05 | Example of invention |
| 26 | D1-1 | 11 | 1 | 80 | 108 | 0.003 | x | 0.06 | x | 11.0 | ○ | 1.18 | Comparative Example |
| 27 | D1-2 | 13 | 2 | 85 | 175 | 0.004 | x | 0.06 | x | 6.5 | ○ | 1.17 | Comparative Example |
| 28 | D1-3 | 17 | 16 | 78 | 21 | 0.009 | x | 0.33 | ○ | 1.1 | ○ | 1.16 | Comparative Example |
| 29 | D1-4 | 79 | 32 | 146 | 26 | 0.030 | ○ | 0.65 | ○ | 2.5 | ○ | 1.07 | Example of invention |
| 30 | D1-5 | 72 | 28 | 138 | 25 | 0.027 | ○ | 0.61 | ○ | 2.6 | ○ | 1.07 | Example of invention |
| 31 | D1-6 | 57 | 13 | 133 | 66 | 0.019 | ○ | 0.35 | ○ | 4.4 | ○ | 1.08 | Example of invention |
| 32 | D1-7 | 77 | 169 | 129 | 39 | 0.068 | ○ | 1.46 | ○ | 0.5 | x | 1.09 | Example of invention |

TABLE 4H-continued

| No. | Steel type | Nal | Nac | Nbl | Nbc | (Nal + Nac)/ Nt | Determination Formula (1) | (Nal + Nac)/ (Nbl + Nbc) | Determination Formula (2) | Nal/ Nac | Determination Formula (3) | BF | Note |
|---|---|---|---|---|---|---|---|---|---|---|---|---|---|
| 33 | D1-8 | 116 | 162 | 98 | 28 | 0.076 | ○ | 2.21 | ○ | 0.7 | x | 1.07 | Example of invention |
| 34 | D1-9 | 156 | 159 | 76 | 19 | 0.087 | ○ | 3.32 | ○ | 1.0 | ○ | 1.06 | Example of invention |

TABLE 4I

| No. | Steel type | Nal | Nac | Nbl | Nbc | (Nal + Nac)/ Nt | Determination Formula (1) | (Nal + Nac)/ (Nbl + Nbc) | Determination Formula (2) | Nal/ Nac | Determination Formula (3) | BF | Note |
|---|---|---|---|---|---|---|---|---|---|---|---|---|---|
| 35 | D1-10 | 220 | 123 | 43 | 9 | 0.094 | ○ | 6.60 | ○ | 1.8 | ○ | 1.05 | Example of invention |
| 36 | D1-11 | 273 | 70 | 24 | 6 | 0.094 | ○ | 11.43 | ○ | 3.9 | ○ | 1.04 | Example of invention |
| 37 | E1 | 32 | 66 | 79 | 166 | 0.027 | ○ | 0.40 | ○ | 0.5 | x | 1.09 | Example of invention |
| 38 | F1 | 110 | 244 | 136 | 298 | 0.097 | ○ | 0.82 | ○ | 0.5 | x | 1.07 | Example of invention |
| 39 | G1 | 32 | 67 | 75 | 162 | 0.027 | ○ | 0.42 | ○ | 0.5 | x | 1.10 | Example of invention |
| 40 | H1 | 37 | 78 | 52 | 110 | 0.032 | ○ | 0.71 | ○ | 0.5 | x | 1.09 | Example of invention |
| 41 | I1 | 98 | 224 | 130 | 293 | 0.089 | ○ | 0.76 | ○ | 0.4 | x | 1.07 | Example of invention |
| 42 | J1 | 97 | 219 | 129 | 293 | 0.087 | ○ | 0.75 | ○ | 0.4 | x | 1.06 | Example of invention |
| 43 | K1 | 72 | 154 | 134 | 291 | 0.062 | ○ | 0.53 | ○ | 0.5 | x | 1.08 | Example of invention |
| 44 | L1 | 68 | 155 | 148 | 423 | 0.061 | ○ | 0.39 | ○ | 0.4 | x | 1.08 | Example of invention |
| 45 | M1 | 106 | 231 | 134 | 295 | 0.092 | ○ | 0.79 | ○ | 0.5 | x | 1.06 | Example of invention |
| 46 | N1 | 76 | 162 | 139 | 288 | 0.065 | ○ | 0.56 | ○ | 0.5 | x | 1.08 | Example of invention |
| 47 | O1 | 104 | 233 | 131 | 295 | 0.092 | ○ | 0.79 | ○ | 0.4 | x | 1.07 | Example of invention |
| 48 | P1 | 105 | 223 | 133 | 285 | 0.090 | ○ | 0.79 | ○ | 0.5 | x | 1.06 | Example of invention |
| 49 | Q1 | 100 | 227 | 132 | 292 | 0.090 | ○ | 0.77 | ○ | 0.4 | x | 1.06 | Example of invention |
| 50 | R1 | 74 | 161 | 138 | 298 | 0.065 | ○ | 0.54 | ○ | 0.5 | x | 1.07 | Example of invention |
| 51 | S1 | 100 | 221 | 131 | 289 | 0.088 | ○ | 0.77 | ○ | 0.5 | x | 1.06 | Example of invention |
| 52 | T1 | 98 | 230 | 128 | 293 | 0.090 | ○ | 0.78 | ○ | 0.4 | x | 1.06 | Example of invention |

Based on the above results, it can be clearly understood that, in the wound core of the present invention, in at least one corner portion 3, at least one of two or more bent portions 5 satisfied the above Formula (1) so that the wound core had low iron loss properties.

INDUSTRIAL APPLICABILITY

According to the present invention, it is possible to effectively minimize unintentional efficiency deterioration in the wound core obtained by laminated bent steel sheets.

BRIEF DESCRIPTION OF THE REFERENCE SYMBOLS

1 Grain-oriented electrical steel sheet
2 Laminated structure
3 Corner portion
4 Planar portion
5 Bent portion
6 Joining part
10 Wound core main body

The invention claimed is:

1. A wound core including a substantially rectangular wound core main body in a side view, wherein the wound core main body includes a portion in which grain-oriented electrical steel sheets in which first planar portions and corner portions are alternately continuous in a longitudinal direction and an angle formed by two first planar portions adjacent to each other with each of the corner portions therebetween is 90° are stacked in a sheet thickness direction and has a substantially rectangular laminated structure in a side view, wherein in a side view of the grain-oriented electrical steel sheets, each of the corner portions has two or more bent portions having a curved shape and a second planar portion between the adjacent bent portions, and a sum of bent angles of the bent portions present in one corner portion is 90°, wherein the two or more bent portions in a side view has an inner radius of curvature r of 1 mm or more and 5 mm or less, wherein the grain-oriented electrical steel sheets have a chemical composition containing, in mass %, Si: 2.0 to 7.0%, with the remainder comprising Fe and impurities, and have a texture oriented in the Goss orientation, and wherein in one or more of the first planar portion and the second planar portion adjacent to at least one of the bent portions, an existence frequency of subgrain boundaries in a region within 9 mm in a direction perpendicular to a boundary with the at least one of the bent portions satisfies the following Formula (1):

$$(Nac+Nal)/Nt \geq 0.010 \quad (1)$$

where, when a plurality of measurement points are arranged at intervals of 2 mm in a direction parallel to and direction vertical to the bent portion boundary in the region of the one or more of the first planar portion or the second planar portion adjacent to the at least one of the bent portions, Nt in Formula (1) is a total number of line segments connecting two adjacent measurement points in the parallel direction and the vertical direction, Nac in Formula (1) is the number of line segments at which subgrain boundaries are able to be identified among the line segments direction parallel to the bent portion boundary, and Nal in Formula (1) is the number of line segments at which subgrain boundaries are able to be identified among line segments in a direction perpendicular to the bent portion boundary.

2. The wound core according to claim 1, wherein, in one or more of the first planar portion and the second planar portion adjacent to at least one of the bent portions, the following Formula (2) is satisfied:

$$(Nac+Nal)/(Nbc+Nbl) > 0.30 \quad (2)$$

where Nbc in Formula (2) is the number of line segments at which grain boundaries other than the subgrain boundaries are able to be identified among the line segments in a direction parallel to the bent portion boundary, and Nbl in Formula (2) is the number of line segments at which grain boundaries other than the subgrain boundaries are able to be identified among the line segments in a direction perpendicular to the bent portion boundary.

3. The wound core according to claim 1, wherein, in one or more of the first planar portion and the second planar portion adjacent to at least one of the bent portions, the following Formula (3) is satisfied:

$$Nal/Nac \geq 0.80 \quad (3).$$

4. The wound core according to claim 2, wherein, in one or more of the first planar portion and the second planar portion adjacent to at least one of the bent portions, the following Formula (3) is satisfied:

$$Nal/Nac \geq 0.80 \quad (3).$$

5. The wound core according to claim 1, wherein the chemical composition of the grain-oriented electrical steel sheets contain, in mass %, Si: 2.0 to 7.0%,
Nb: 0 to 0.030%,
V: 0 to 0.030%,
Mo: 0 to 0.030%,
Ta: 0 to 0.030%,
W: 0 to 0.030%,
C: 0 to 0.0050%,
Mn: 0 to 1.0%,
S: 0 to 0.0150%,
Se: 0 to 0.0150%,
Al: 0 to 0.0650%,
N: 0 to 0.0050%,
Cu: 0 to 0.40%,
Bi: 0 to 0.010%,
B: 0 to 0.080%,
P: 0 to 0.50%,
Ti: 0 to 0.0150%,
Sn: 0 to 0.10%,
Sb: 0 to 0.10%,
Cr: 0 to 0.30%, and
Ni: 0 to 1.0%, with the remainder comprising Fe and impurities.

6. The wound core according to claim 1, wherein the chemical composition of the grain-oriented electrical steel sheets contain a total amount of 0.0030 to 0.030 mass % of at least one of Nb, V, Mo, Ta, and W.

7. The wound core according to claim 5, wherein the chemical composition of the grain-oriented electrical steel sheets contain a total amount of 0.0030 to 0.030 mass % of at least one of Nb, V, Mo, Ta, and W.

8. The wound core according to claim 2, wherein the chemical composition of the grain-oriented electrical steel sheets contain, in mass %, Si: 2.0 to 7.0%,
Nb: 0 to 0.030%,
V: 0 to 0.030%,
Mo: 0 to 0.030%,
Ta: 0 to 0.030%,
W: 0 to 0.030%,
C: 0 to 0.0050%,
Mn: 0 to 1.0%,
S: 0 to 0.0150%,
Se: 0 to 0.0150%,
Al: 0 to 0.0650%,
N: 0 to 0.0050%,
Cu: 0 to 0.40%,
Bi: 0 to 0.010%,
B: 0 to 0.080%,
P: 0 to 0.50%,
Ti: 0 to 0.0150%,
Sn: 0 to 0.10%,
Sb: 0 to 0.10%,
Cr: 0 to 0.30%, and
Ni: 0 to 1.0%, with the remainder comprising Fe and impurities.

9. The wound core according to claim 3, wherein the chemical composition of the grain-oriented electrical steel sheets contain, in mass %, Si: 2.0 to 7.0%,
Nb: 0 to 0.030%,
V: 0 to 0.030%,
Mo: 0 to 0.030%,
Ta: 0 to 0.030%,
W: 0 to 0.030%,
C: 0 to 0.0050%,
Mn: 0 to 1.0%,
S: 0 to 0.0150%,
Se: 0 to 0.0150%,
Al: 0 to 0.0650%,
N: 0 to 0.0050%, Cu: 0 to 0.40%,
Bi: 0 to 0.010%,
B: 0 to 0.080%,
P: 0 to 0.50%,
Ti: 0 to 0.0150%,
Sn: 0 to 0.10%,
Sb: 0 to 0.10%,
Cr: 0 to 0.30%, and
Ni: 0 to 1.0%, with the remainder comprising Fe and impurities.

10. The wound core according to claim 4,
wherein the chemical composition of the grain-oriented electrical steel sheets contain, in mass %,
Si: 2.0 to 7.0%,
Nb: 0 to 0.030%,
V: 0 to 0.030%,
Mo: 0 to 0.030%,
Ta: 0 to 0.030%,
W: 0 to 0.030%,
C: 0 to 0.0050%,
Mn: 0 to 1.0%,
S: 0 to 0.0150%,
Se: 0 to 0.0150%,
Al: 0 to 0.0650%,
N: 0 to 0.0050%,
Cu: 0 to 0.40%,
Bi: 0 to 0.010%,
B: 0 to 0.080%,
P: 0 to 0.50%,
Ti: 0 to 0.0150%,
Sn: 0 to 0.10%,
Sb: 0 to 0.10%,
Cr: 0 to 0.30%, and
Ni: 0 to 1.0%, with the remainder comprising Fe and impurities.

11. The wound core according to claim 2, wherein the chemical composition of the grain-oriented electrical steel sheets contain a total amount of 0.0030 to 0.030 mass % of at least one of Nb, V, Mo, Ta, and W.

12. The wound core according to claim 3, wherein the chemical composition of the grain-oriented electrical steel sheets contain a total amount of 0.0030 to 0.030 mass % of at least one of Nb, V, Mo, Ta, and W.

13. The wound core according to claim 4, wherein the chemical composition of the grain-oriented electrical steel sheets contain a total amount of 0.0030 to 0.030 mass % of at least one of Nb, V, Mo, Ta, and W.

* * * * *